US012426055B2

(12) United States Patent
Wang et al.

(10) Patent No.: US 12,426,055 B2
(45) Date of Patent: Sep. 23, 2025

(54) MULTIPLE TRANSPORT BLOCK (TB) GRANT FOR SIDELINK

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 351 days.

(21) Appl. No.: 17/851,683

(22) Filed: Jun. 28, 2022

(65) Prior Publication Data

US 2023/0422258 A1   Dec. 28, 2023

(51) Int. Cl.
| | | |
|---|---|---|
| *H04W 72/14* | (2009.01) | |
| *H04W 16/28* | (2009.01) | |
| *H04W 72/20* | (2023.01) | |
| *H04W 72/23* | (2023.01) | |
| *H04W 92/18* | (2009.01) | |

(52) U.S. Cl.
CPC .......... *H04W 72/23* (2023.01); *H04W 16/28* (2013.01); *H04W 72/20* (2023.01); *H04W 92/18* (2013.01)

(58) Field of Classification Search
CPC ..... H04W 72/20; H04W 16/28; H04W 72/23; H04W 72/232; H04W 72/40; H04W 76/14; H04W 92/18
See application file for complete search history.

(56) References Cited

U.S. PATENT DOCUMENTS

| | | | | |
|---|---|---|---|---|
| 2016/0119105 | A1* | 4/2016 | Jiang | ..................... H04L 1/1812 |
| | | | | 370/329 |
| 2020/0029318 | A1* | 1/2020 | Guo | ........................ H04W 4/40 |
| 2020/0229007 | A1* | 7/2020 | Jung | ..................... H04W 76/10 |
| 2021/0298058 | A1* | 9/2021 | Bergman | .............. H04L 1/1812 |

* cited by examiner

*Primary Examiner* — Mansour Oveissi
(74) *Attorney, Agent, or Firm* — Holland & Hart LLP

(57) ABSTRACT

Methods, systems, and devices for wireless communications are described. In some examples, a user equipment (UE) may transmit to a network entity a first signal requesting a modification of allocated resources for sidelink transmission, sidelink reception, or both based on multiple transport blocks (TBs) for communication for the UE. The UE may receive, from the network entity, a downlink control information (DCI) signal granting one or more resources to the UE for sidelink communications based on the first signal. In some cases, the DCI signal may dynamically or periodically grant one or more resources for sidelink transmission, one or more resources for sidelink reception, or both for the UE. The UE may use the granted resources to communicate multiple TBs with one or more other UEs based on the DCI signal. For example, a single DCI message may allocate resources for sidelink communication of multiple TBs.

30 Claims, 18 Drawing Sheets

MULTIPLE TRANSPORT BLOCK (TB) GRANT FOR SIDELINK

FIELD OF TECHNOLOGY

The following relates to wireless communications, including a multiple transport block (TB) grant for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may configure a UE with resources for sidelink transmission of a transport block (TB). The network entity may indicate a hybrid automatic repeat request (HARQ) process number (HPN) corresponding to the TB transmission to support feedback and retransmission of the TB. However, such a configuration may fail to support flexibility in how the UE uses the resources. For example, if the UE has multiple TBs to transmit, the UE may transmit one TB using sidelink resources configured in a downlink control information (DCI) grant based on the HARQ process number. To transmit multiple TBs via sidelink, the UE may receive multiple respective DCI grants, potentially increasing latency and signaling overhead associated with sidelink communications.

SUMMARY

The described techniques relate to improved methods, systems, devices, and apparatuses that support a multiple transport block (TB) grant for sidelink. For example, the described techniques may reduce latency in scheduling sidelink resources for sidelink communications. In accordance with aspects of the present disclosure, a first user equipment (UE) may transmit, to a network entity, a first signal requesting a modification of allocated resources for sidelink communications (e.g., sidelink transmission, sidelink reception, or both). For example, the first UE may request the modification of allocated resources based on multiple TBs for sidelink communication. The network entity may allocate a set of resources based on the first signal and transmit a downlink control information (DCI) signal (e.g., a DCI message) to the UE granting the allocated resources for sidelink communications. For example, the DCI may grant resources for sidelink transmission by the first UE, sidelink reception at the first UE, or both. The DCI may dynamically grant the resources to the first UE or may repeatedly grant the resources to the first UE according to a periodicity. The first UE may communicate multiple TBs via the granted resources based on the DCI signal. For example, based on a single DCI message, the first UE may transmit one or more TBs to one or more other UEs via sidelink signaling, receive one or more TBs from one or more other UEs via sidelink signaling, or both. The UEs may track feedback information and determine whether to retransmit a TB (e.g., independent of the network). The UEs may improve sidelink latency and reduce signaling overhead associated with configuring sidelink resources by supporting communication of multiple TBs using resources configured in a single grant for sidelink (e.g., a multiple TB grant in a DCI message).

A method for wireless communications at a UE is described. The method may include transmitting a first signal requesting a modification of allocated resources for sidelink transmission, sidelink reception, or both based on multiple TBs for communication for the UE, receiving a DCI signal granting one or more resources to the UE for sidelink transmission, sidelink reception, or both based on the first signal, the DCI signal granting the one or more resources for communication of the multiple TBs, and communicating, with one or more other UEs, a set of multiple TBs via the granted one or more resources based on the DCI signal.

An apparatus for wireless communications at a UE is described. The apparatus may include a processor, memory coupled with the processor, and instructions stored in the memory. The instructions may be executable by the processor to cause the apparatus to transmit a first signal requesting a modification of allocated resources for sidelink transmission, sidelink reception, or both based on multiple TBs for communication for the UE, receive a DCI signal granting one or more resources to the UE for sidelink transmission, sidelink reception, or both based on the first signal, the DCI signal granting the one or more resources for communication of the multiple TBs, and communicate, with one or more other UEs, a set of multiple TBs via the granted one or more resources based on the DCI signal.

Another apparatus for wireless communications at a UE is described. The apparatus may include means for transmitting a first signal requesting a modification of allocated resources for sidelink transmission, sidelink reception, or both based on multiple TBs for communication for the UE, means for receiving a DCI signal granting one or more resources to the UE for sidelink transmission, sidelink reception, or both based on the first signal, the DCI signal granting the one or more resources for communication of the multiple TBs, and means for communicating, with one or more other UEs, a set of multiple TBs via the granted one or more resources based on the DCI signal.

A non-transitory computer-readable medium storing code for wireless communications at a UE is described. The code may include instructions executable by a processor to transmit a first signal requesting a modification of allocated resources for sidelink transmission, sidelink reception, or both based on multiple TBs for communication for the UE, receive a DCI signal granting one or more resources to the UE for sidelink transmission, sidelink reception, or both based on the first signal, the DCI signal granting the one or more resources for communication of the multiple TBs, and communicate, with one or more other UEs, a set of multiple TBs via the granted one or more resources based on the DCI signal.

Some examples of the method, apparatuses, and non-transitory computer-readable medium described herein may further include operations, features, means, or instructions for generating an accumulated buffer status report (BSR) based on a quantity of information stored using a buffer for transmission to a set of multiple other UEs, where the first signal includes the accumulated BSR.

Some examples of the method, apparatuses, and non-transitory computer-readable medium described herein may further include operations, features, means, or instructions for generating a preemptive BSR based on a quantity of information expected for reception at the UE from a set of multiple other UEs, where the first signal includes the preemptive BSR.

In some examples of the method, apparatuses, and non-transitory computer-readable medium described herein, the first signal indicates a negative value associated with the modification of the allocated resources and the granted one or more resources includes a first quantity of resources that is less than a second quantity of resources corresponding to the allocated resources to be modified.

Some examples of the method, apparatuses, and non-transitory computer-readable medium described herein may further include operations, features, means, or instructions for transmitting, to a second UE of the one or more other UEs, a signal indicating at least a portion of the granted one or more resources for sidelink transmission from the second UE to the UE, one of more transmission parameters for sidelink transmission from the second UE to the UE, or both, where the communicating may be based on the signal.

In some examples of the method, apparatuses, and non-transitory computer-readable medium described herein, the communicating may include operations, features, means, or instructions for transmitting a first TB of the set of multiple TBs via a first subset of the granted one or more resources configured for sidelink transmission that may be at least a first threshold time after the DCI signal is received and receiving a second TB of the set of multiple TBs via a second subset of the granted one or more resources configured for sidelink reception that may be at least a second threshold time after the DCI signal is received, the second threshold time being greater than the first threshold time.

Some examples of the method, apparatuses, and non-transitory computer-readable medium described herein may further include operations, features, means, or instructions for transmitting, in response to the DCI signal, a feedback signal indicating that the DCI signal is received.

In some examples of the method, apparatuses, and non-transitory computer-readable medium described herein, the feedback signal requests allocation of additional resources, cancelation of a subset of the granted one or more resources, or both based on the granted one or more resources.

In some examples of the method, apparatuses, and non-transitory computer-readable medium described herein, the DCI signal indicates a grant index corresponding to the granted one or more resources, and the method, apparatuses, and non-transitory computer-readable medium may include further operations, features, means, or instructions for receiving a second DCI signal modifying the granted one or more resources, deactivating the granted one or more resources, canceling the granted one or more resources, or any combination thereof based on the second DCI signal indicating the grant index.

In some examples of the method, apparatuses, and non-transitory computer-readable medium described herein, the communicating may include operations, features, means, or instructions for transmitting, to one or more first UEs, one or more first TBs via the granted one or more resources, receiving, from one or more second UEs, one or more second TBs via the granted one or more resources, or both.

In some examples of the method, apparatuses, and non-transitory computer-readable medium described herein, the communicating may include operations, features, means, or instructions for communicating a TB of the set of multiple TBs based on a transmit power indicated according to the DCI signal.

In some examples of the method, apparatuses, and non-transitory computer-readable medium described herein, the communicating may include operations, features, means, or instructions for communicating a TB of the set of multiple TBs using a beam based on a set of allowed beams, a set of allowed beam directions, a set of prohibited beams, a set of prohibited beam directions, or any combination thereof indicated according to the DCI signal.

In some examples of the method, apparatuses, and non-transitory computer-readable medium described herein, the communicating may include operations, features, means, or instructions for communicating a first TB of the set of multiple TBs via a first subset of the granted one or more resources and communicating a second TB of the set of multiple TBs via a second subset of the granted one or more resources, the first subset of the granted one or more resources being distinct from the second subset of the granted one or more resources.

Some examples of the method, apparatuses, and non-transitory computer-readable medium described herein may further include operations, features, means, or instructions for transmitting one or more sidelink channel state information (CSI) reference signals (RSs) based on the DCI signal indicating a set of resources configured for sidelink CSI-RSs.

In some examples of the method, apparatuses, and non-transitory computer-readable medium described herein, the DCI signal dynamically grants a first set of resources, periodically grants a second set of resources according to a periodicity, or both.

In some examples of the method, apparatuses, and non-transitory computer-readable medium described herein, the DCI signal grants a first set of resources for sidelink transmission from the UE, a second set of resources for sidelink reception at the UE, a third set of resources for sidelink transmission, sidelink reception, or both for the UE, or any combination thereof.

In some examples of the method, apparatuses, and non-transitory computer-readable medium described herein, a first TB of the set of multiple TBs corresponds to a first hybrid automatic repeat request (HARD) process number (HPN), a first new data indicator (NDI), or both, and a second TB of the set of multiple TBs corresponds to a second HPN different from the first HPN, a second NDI different from the first NDI, or both.

A method for wireless communications at a network entity is described. The method may include receiving a first signal requesting a modification of allocated resources for sidelink transmission, sidelink reception, or both for a UE based on multiple TBs for communication for the UE and transmitting a DCI signal granting one or more resources to the UE for sidelink transmission, sidelink reception, or both based on the first signal, the DCI signal granting the one or more resources for communication of the multiple TBs.

An apparatus for wireless communications at a network entity is described. The apparatus may include a processor, memory coupled with the processor, and instructions stored in the memory. The instructions may be executable by the processor to cause the apparatus to receive a first signal requesting a modification of allocated resources for sidelink transmission, sidelink reception, or both for a UE based on multiple TBs for communication for the UE and transmit a DCI signal granting one or more resources to the UE for sidelink transmission, sidelink reception, or both based on the first signal, the DCI signal granting the one or more resources for communication of the multiple TBs.

Another apparatus for wireless communications at a network entity is described. The apparatus may include means for receiving a first signal requesting a modification of allocated resources for sidelink transmission, sidelink reception, or both for a UE based on multiple TBs for communication for the UE and means for transmitting a DCI signal granting one or more resources to the UE for sidelink transmission, sidelink reception, or both based on the first signal, the DCI signal granting the one or more resources for communication of the multiple TBs.

A non-transitory computer-readable medium storing code for wireless communications at a network entity is described. The code may include instructions executable by a processor to receive a first signal requesting a modification of allocated resources for sidelink transmission, sidelink reception, or both for a UE based on multiple TBs for communication for the UE and transmit a DCI signal granting one or more resources to the UE for sidelink transmission, sidelink reception, or both based on the first signal, the DCI signal granting the one or more resources for communication of the multiple TBs.

Some examples of the method, apparatuses, and non-transitory computer-readable medium described herein may further include operations, features, means, or instructions for allocating a first set of resources for sidelink transmission at the UE based on the first signal including an accumulated BSR associated with a quantity of information for sidelink transmission at the UE, where the granted one or more resources include the first set of resources.

Some examples of the method, apparatuses, and non-transitory computer-readable medium described herein may further include operations, features, means, or instructions for allocating a second set of resources for sidelink reception at the UE based on the first signal including a preemptive BSR associated with a quantity of information for sidelink reception at the UE, where the granted one or more resources include the second set of resources.

In some examples of the method, apparatuses, and non-transitory computer-readable medium described herein, the first signal indicates a negative value associated with the modification of the allocated resources, and the granted one or more resources includes a first quantity of resources that is less than a second quantity of resources corresponding to the allocated resources to be modified.

Some examples of the method, apparatuses, and non-transitory computer-readable medium described herein may further include operations, features, means, or instructions for receiving, in response to the DCI signal, a feedback signal indicating that the DCI signal may be received at the UE.

In some examples of the method, apparatuses, and non-transitory computer-readable medium described herein, the feedback signal requests allocation of additional resources, cancelation of a subset of the granted one or more resources, or both based on the granted one or more resources, and the method, apparatuses, and non-transitory computer-readable medium may include further operations, features, means, or instructions for transmitting a second DCI signal based on the feedback signal.

In some examples of the method, apparatuses, and non-transitory computer-readable medium described herein, the DCI signal indicates a grant index corresponding to the granted one or more resources, and the method, apparatuses, and non-transitory computer-readable medium may include further operations, features, means, or instructions for transmitting a second DCI signal modifying the granted one or more resources, deactivating the granted one or more resources, canceling the granted one or more resources, or any combination thereof based on the second DCI signal indicating the grant index.

In some examples of the method, apparatuses, and non-transitory computer-readable medium described herein, the DCI signal dynamically grants a first set of resources, periodically grants a second set of resources according to a periodicity, or both.

In some examples of the method, apparatuses, and non-transitory computer-readable medium described herein, the DCI signal grants a first set of resources for sidelink transmission from the UE, a second set of resources for sidelink reception at the UE, a third set of resources for sidelink transmission, sidelink reception, or both for the UE, or any combination thereof.

In some examples of the method, apparatuses, and non-transitory computer-readable medium described herein, the DCI signal indicates a transmit power for sidelink transmission, sidelink reception, or both, a set of allowed beams, a set of allowed beam directions, a set of prohibited beams, a set of prohibited beam directions, or any combination thereof.

DETAILED DESCRIPTION

Figure 1:
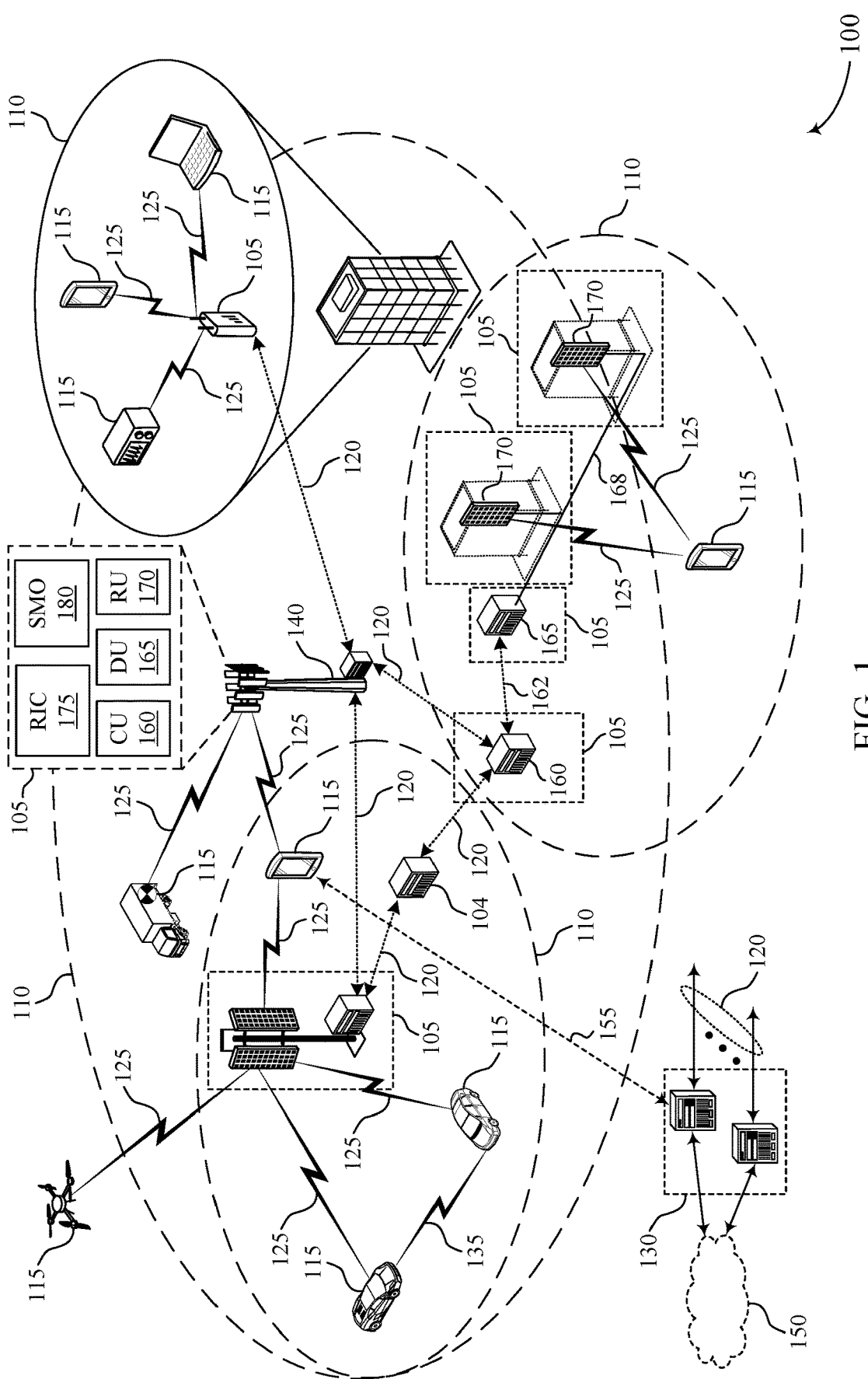
FIGS. 1 and 2 illustrate examples of wireless communications systems that support a multiple TB grant for sidelink in accordance with one or more aspects of the present disclosure.

In some wireless communications systems, a network entity may configure a user equipment (UE) with resources for sidelink transmission. For example, the network entity may transmit a downlink control information (DCI) signal, to the UE, that indicates time and frequency resource assignments for transmission of a transport block (TB). The UE may select a TB for transmission and may use the time and frequency resource assignment to transmit the TB to another UE via sidelink. In some cases, however, the UE may have multiple TBs to send to one or more other UEs. In such cases, the UE may not have the flexibility to transmit more than one TB using the resources assigned by the DCI signal (e.g., a DCI message). For example, if the UE has multiple TBs to be transmitted, the network entity may transmit a separate DCI message to allocate resources for each TB, which may increase the latency and the signaling overhead involved in scheduling sidelink communications. Additionally, the network entity may fail to configure the UE with resources in which to receive sidelink messages from other UEs.

The techniques described herein may enable a UE to use the resources allocated within a single DCI message to communicate multiple TBs (e.g., transmit one or more TBs, receive one or more TBs, or a combination of both) via a sidelink interface. For example, the UE may transmit, to a network entity, a signal (e.g., a scheduling request (SR) or a buffer status report (BSR)) requesting a modification of resources allocated for sidelink transmission, sidelink reception, or both at the UE. The UE may determine to request the resource modification based on multiple TBs pending communication at the UE. The network entity may allocate resources based on the received signal requesting the modification of resources, sidelink channel conditions, or both. The network entity may transmit a DCI signal (e.g., a DCI message) dynamically granting the allocated resources to the UE or periodically granting the allocated resources to the UE according to a periodicity. The UE may determine which TBs to transmit or receive in the granted resources (e.g., independent of the network). For example, the UE may use the resources granted by a single DCI message to transmit one or more TBs to one or more other UEs, receive one or more TBs from one or more other UEs, or both via sidelink signaling. The UE may manage feedback information for the TBs to determine whether to retransmit TBs via sidelink signaling, for example, rather than use a one-to-one mapping from a hybrid automatic repeat request (HARQ) process number (HPN) indicated by the network in a DCI message to a TB for transmission. In some examples, the UE may signal to the network entity an indication of unused resources. In some such examples, the network entity may modify or cancel resources based on this indication.

The techniques described herein may enable the network device and the UE to flexibly manage resource allocation for sidelink communications. For example, the network entity may use a single DCI message to allocate resources for the UE to communicate multiple TBs via sidelink (e.g., a multiple TB grant for sidelink). Accordingly, the latency involved in scheduling resources for sidelink communications may improve, for example, based on a UE communicating multiple TBs (e.g., transmitting one or more TBs, receiving one or more TBs) via sidelink according to a single DCI signal, as opposed to using multiple respective DCI signals to schedule multiple TB communications. Additionally, or alternatively, using a single DCI message—as compared to multiple DCI messages—to allocate resources for multiple TB sidelink communications may reduce the signaling overhead involved in network-based sidelink resource allocation. By managing feedback information at the UEs, as opposed to the network, the UEs may support efficient retransmission of sidelink signaling without a one-to-one mapping between DCI sidelink grants and TBs for sidelink transmission.

Aspects of the disclosure are initially described in the context of wireless communications systems. Aspects of the disclosure are further illustrated by and described with reference to resource allocations, process flows, apparatus diagrams, system diagrams, and flowcharts that relate to multiple TB grants for sidelink.

FIG. 1 illustrates an example of a wireless communications system 100 that supports a multiple TB grant for sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multiple TB grants for sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the wireless communications system 100 may be an example of or include a V2X system. In V2X systems, a UE 115 (e.g., vehicle) may communicate with one or more other UEs 115 via one or more sidelink communication interfaces. For V2X sidelink communications, there may be two methods of resource allocation: Mode 1 and Mode 2.

In sidelink mode 1, a network entity 105 may assign a UE 115 transmission resources for sidelink communications using a control message, such as an RRC message or a DCI message. For example, the UE 115 operating in mode 1 may receive dynamic grants, configured grants (CGs) type 1, CGs type 2, or any combination thereof to configure resources for sidelink transmission. The network entity 105 may activate a CG type 1 via RRC signaling to the UE 115, while the network entity 105 may activate a CG Type 2 via DCI signaling to the UE 115. For a dynamic grant, the network entity 105 may transmit a DCI message to allocate time and frequency resources to the UE 115 for sidelink transmission. The DCI message may specify a resource assignment for one TB. The UE 115 may maintain a one-to-one mapping of a hybrid automatic repeat request (HARD) process number (HPN) in the DCI with sidelink control information (SCI) for a TB. Additionally, the network entity 105 may use a new data indicator (NDI) in the DCI to toggle the NDI in the SCI for the UE 115. For example, the network entity 105 may toggle the NDI (e.g., switch the NDI bit from a first bit value to a second bit value) to indicate that the UE 115 is to transmit new data in the sidelink resources (e.g., rather than retransmitting a TB). The network entity 105 may indicate transmission timing to the UE 115 via the DCI message. In some examples, in mode 1, the UE 115 may determine the modulation and coding scheme (MCS) for sidelink transmissions within parameters set by the network entity 105.

In sidelink mode 2, the UE 115 may autonomously determine resources for sidelink communications (e.g., independent of a network entity 105). For example, the UE 115 operating in mode 2 may perform channel sensing for sidelink channels to detect sidelink channel occupancy. In some examples, the UE 115 may blindly decode signals sent via one or more PSCCHs. Using the blind decoding, the UE 115 may detect reserved resources based on other sidelink transmissions within the V2X system. The UE 115 may determine available resources within the V2X network and may perform resource allocation and usage based on the available resources for the sidelink channels.

Additionally, or alternatively, the wireless communications system 100 may be an example of or include an industrial internet of things (IIoT) system. In the IIoT system, the UE 115 may be an example of a programmable logic controller (PLC). Additionally, other UEs 115 may be examples of sensors/actuators (SAs). In such systems, the PLC and the SAs may communicate over one or more sidelink communication interfaces. The PLC may control multiple SAs (e.g., 20 to 50, or any other quantity). Such systems may follow a latency threshold (e.g., 1 to 2 ms), a reliability threshold (e.g., $10^{-6}$ error rate), or both. To meet such thresholds, a PLC and multiple SAs may support efficient, relatively low latency sidelink communications.

In any such system supporting sidelink communications, a UE 115 may transmit to a network entity 105 a first signal requesting a modification of allocated resources for sidelink communications based on multiple transport blocks for communication for the UE 115. The UE 115 may receive from the network entity 105, a DCI signal granting one or more resources to the UE for sidelink communication based on the first signal. In some cases, the DCI signal may grant the one or more resources for communication of multiple TBs to one or more UEs 115. By granting resources for multiple TBs using a single DCI message, the network entity 105 may improve the latency involved in sidelink communications. The UE 115 may communicate, with the one or more other UEs 115, multiple TBs via the granted resources based on the DCI signal.

Figure 2:
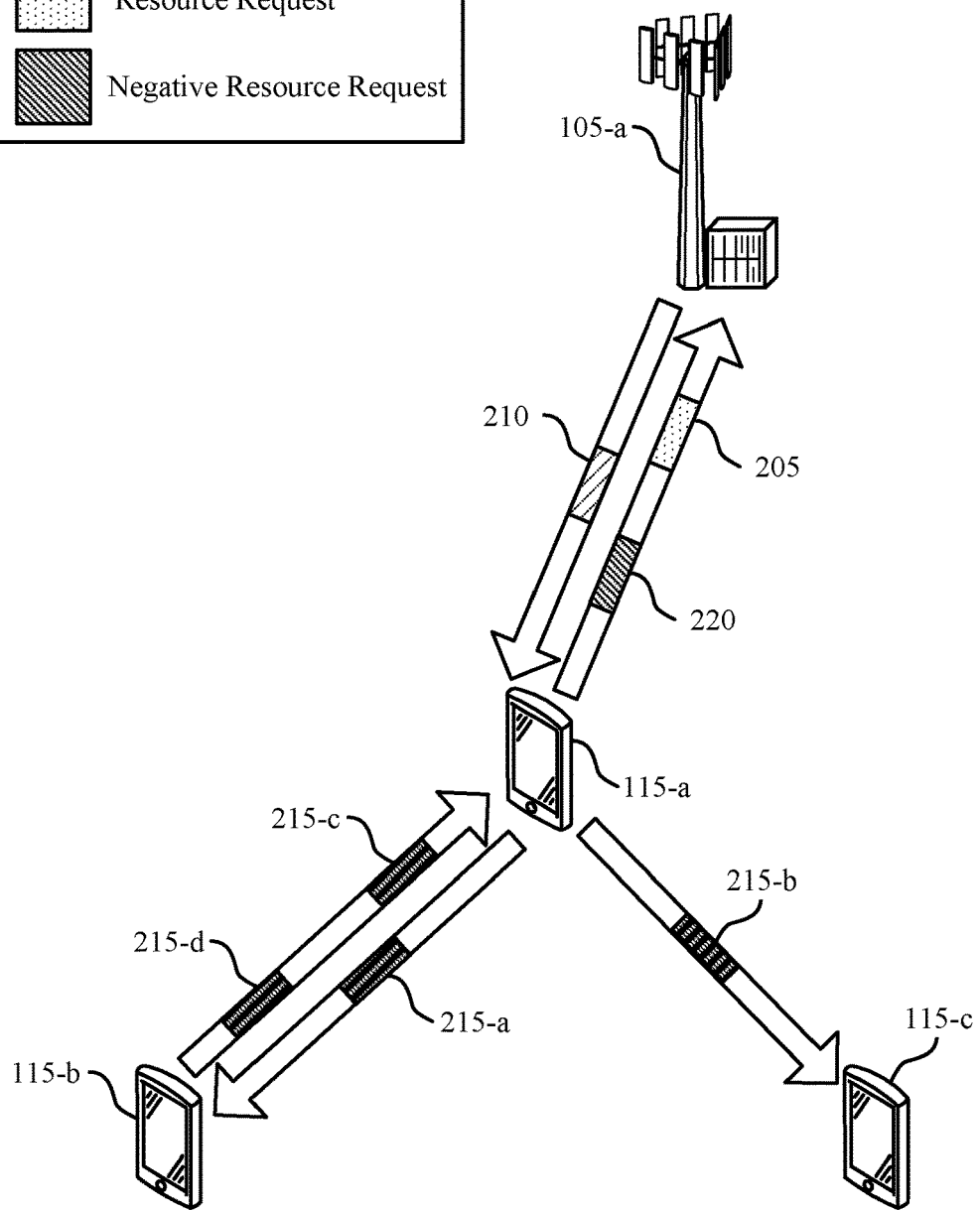

FIG. 2 illustrates an example of a wireless communications system 200 that supports a multiple TB grant for sidelink in accordance with one or more aspects of the present disclosure. The wireless communications system 200 may implement or be implemented by aspects of a wireless communications system 100. For example, the wireless communications system 200 may include a network entity 105-*a*, which may be an example of a network entity 105 described herein with reference to FIG. 1. Likewise, the wireless communications system 200 may include a UE 115-*a*, a UE 115-*b*, and a UE 115-*c*, which may be examples of corresponding UEs 115 described herein with reference to FIG. 1. Additionally, the UE 115-*a* may be an example of a PLC in an IIoT communications system or an example of a vehicle in a V2X communications system. Similarly, the UE 115-*b* and the UE 115-*c* may be examples of SAs, vehicles, or pedestrian UEs in wireless communications systems. The network entity 105 may configure the UE 115-*a* with resources for sidelink communication (e.g., transmission, reception, or both) of multiple TBs using a control message (e.g., a DCI message).

In some examples, a network entity 105 and a UE 115 may operate in sidelink mode 1. In sidelink mode 1, the network entity 105 may have a degree of control over resource allocation for the UE 115. In some other systems, the network entity 105 may allocate a resource assignment for transmission of a TB 215 and may transmit the resource assignment to the UE 115, for example, in a DCI message 210. In some cases, the network entity 105, using the NDI, the HPN, or both within the DCI message 210, may indicate to the UE 115 whether to retransmit a TB 215. Additionally, the network entity 105 may specify an MCS range in sidelink mode 1. For example, the network entity 105 may indicate one or more threshold MCS values (e.g., a minimum MCS, a maximum MCS) via RRC signaling to the UE 115.

In some examples, in sidelink mode 1, the UE 115 may have a degree of freedom for resource allocation. For example, the UE 115 may determine an MCS value for the sidelink transmission that is within the range specified by the network entity 105. Additionally, the UE 115 may determine which TB 215 (e.g., including which destination UE 115 or receiver identifier (ID) to target with the TB 215 transmission) to transmit using the resources provided by the network entity 105 (e.g., if the UE 115 is not retransmitting a previously-transmitted TB 215). The UE 115 may also enable or disable sidelink HARQ feedback for the TB 215. For example, the UE 115 may use the HPN indicated in the DCI message 210 to support sidelink HARQ feedback. Furthermore, the UE 115 may have the freedom to determine a demodulation reference signal (DM-RS) pattern and port, signaling layers, precoding, channel state information reference signals (CSI-RSs), a redundancy version ID (RV-ID), a cast type, or any combination thereof for sidelink communications.

However, such techniques for sidelink mode 1 may not provide the network entity 105 the flexibility to enable the UE 115 to have autonomous resource operation. Specifically, the UE 115 may not use the resource assignments for communicating multiple TBs 215, which increases latency associated with increased sidelink scheduling signaling. For example, the UE 115 may receive the DCI message 210 allocating resources for sidelink transmission and indicating an HPN, and the UE 115 may transmit one TB 215 in the allocated resources such that the one TB 215 corresponds to the indicated HPN. If the UE 115 has multiple TBs 215 to transmit to one or more other UEs 115, the network entity 105 may transmit multiple DCI messages 210 to schedule resources for transmission of the multiple TBs 215. In some cases, the UE 115 may receive resource assignments scheduled according to a CG. In such cases, however, the CG resource assignments may support periodic traffic of a same size and may not be suitable for dynamic traffic with different sizes. Additionally, the network entity 105 may not support configuring a first UE 115 with resources in which to receive sidelink messages from other UEs 115. Such other systems may fail to provide a UE 115 the flexibility to use assigned resources from a single DCI message 210 to transmit one or more TBs 215, receive one or more TBs 215, or a combination of both in sidelink mode 1.

The wireless communications system 200 may support flexible resource allocation for a UE 115-*a* to communicate multiple TBs 215 via sidelink. In some examples, the UE 115-*a* may transmit a resource request 205 to a network entity 105-*a* (e.g., a base station, an RU, a DU, a CU, or some combination thereof) indicating a modification of resources allocated for sidelink transmission, sidelink reception, or both at the UE 115-*a*. The resource request 205 may be an example of or include an accumulated BSR report or an SR. The network entity 105-*a* may determine a resource assignment for the UE 115-*a* based on the received resource request 205. For example, the network entity 105-*a* may dynamically assign additional resources to the UE 115-*a* for sidelink communications (e.g., sidelink transmission, sidelink reception) in response to the resource request 205. Additionally, or alternatively, the network entity 105-*a* may configure periodic resources for the UE 115-*a* to use for sidelink communications, may modify a current resource assignment for the UE 115-*a*, may reduce a quantity of resources allocated to the UE 115-*a*, or any combination thereof.

The network entity 105-*a* may transmit an indication of the resource assignment to the UE 115-*a* via a DCI message 210. In some examples, the network entity 105-*a* may provide a dynamic resource assignment (e.g., a one-shot resource assignment). In some other examples, the network entity 105-*a* may configure the UE 115-*a* with a resource assignment that is available in a periodic manner. Additionally, the network entity 105-*a* may indicate a threshold (e.g., maximum) transmission power, a set of beams for transmission (e.g., allowed beams or prohibited beams), or both in the DCI message 210.

The UE 115-*a* may use the allocated resources to transmit one or more TBs 215, receive one or more TBs 215, or a combination of both. In some cases, the network entity 105-*a* may not know nor control the quantity of TBs 215 that the UE 115-*a* may communicate using the allocated resources. In some other cases, the network entity 105-*a* may configure a threshold quantity (e.g., maximum quantity) of TBs 215 that the UE 115-*a* may communicate using the allocated resources. For example, the network entity 105-*a* may indicate the threshold quantity of TBs 215 via RRC signaling (e.g., similar to an indication of an MCS value), via a MAC-CE, or via the DCI message 210.

The UE 115-*a* may transmit a TB 215-*a* to the UE 115-*b* and a TB 215-*b* to the UE 115-*c* using the allocated resources. Additionally, or alternatively, the UE 115-*a* may transmit, to the UE 115-*b*, SCI indicating resources of the allocated resources to use for transmitting a TB 215-*c*, a TB 215-*d*, or both. The UE 115-*a* may receive the TB 215-*c*, the TB 215-*d*, or both from the UE 115-*b* using the allocated resources and based on the SCI. As used herein, a TB 215 may be an example of a packet of data corresponding to a TB size (TBS). Communicating (e.g., transmitting or receiving) a TB 215 may involve encoding the TB 215, modulating a signal to indicate the TB 215 (e.g., the encoded TB 215), communicating the signal, or any combination thereof. As such, communicating a TB 215 via sidelink may involve communicating a signal (e.g., an SCI signal, a physical sidelink shared channel (PSSCH) signal, or both) via a sidelink interface, the signal indicating the information in the TB 215.

In some cases, the network entity 105-*a* may fail to identify accurate sidelink channel state information (CSI) between the UE 115-*a*, the UE 115-*b*, the UE 115-*c*, or some combination thereof. The network entity 105-*a* may fail to allocate, to the UE 115-*a*, a quantity of resources for sidelink communications that supports the sidelink communications between the UE 115-*a*, the UE 115-*b*, the UE 115-*c*, or the combination thereof. For example, the UE 115-*a* may determine that there are too many or too few resources currently allocated to the UE 115-*a* for sidelink based on predicted sidelink traffic (e.g., a BSR, predicted MCS, or both). Accordingly, the UE 115-*a* may calculate a difference between resources predicted for sidelink traffic (e.g., reference resources) and the currently allocated resources and may indicate the difference to the network entity 105-*a*. For example, the UE 115-*a* may determine the difference of resources (e.g., Diff #RE) based on calculating the difference between the quantity of allocated resources (e.g., #AllocRE) and a quantity of reference resources (e.g., #RefRE), as given by Equation 1.

$$\text{Diff \#RE} = \text{\#AllocRE} - \text{\#RefRE} \quad (1)$$

The quantity of reference resources may be a predicted (e.g., optimum) quantity of resources calculated by the UE 115-*a*. For example, the UE 115-*a* may calculate the reference resources based on Equation 2.

$$\text{\#RefRE} = \Sigma_{all\ destination}\ \text{TBsize/SpectEff} \quad (2)$$

The UE 115-*a* may sum the ratios of TB sizes to the spectral efficiency of the channel over which the TBs 215 are to be transmitted for multiple destinations (e.g., multiple destination UEs 115). In some cases, the UE 115-*a* may transmit a relatively large quantity of TBs 215 to a relatively large quantity of UEs 115. In some such cases, assuming an independent distribution for each destination, the quantity of reference resources may be treated as a Gaussian variable.

In some examples, based on determining the difference of resources, the UE 115-*a* may indicate the difference of resources in a resource request 205 or a negative resource request 220. A resource request 205 or a negative resource request 220 may be an example of physical uplink control channel (PUCCH) feedback for resource allocation, where the resource request 205 requests additional resources and the negative resource request 220 requests fewer resources than currently allocated. In some examples, a negative resource request 220 may be an example of an SR or a BSR indicating a negative value (e.g., using a bit field or flag that can indicate either a positive or negative value).

In some cases, the UE 115-*a* may quantize and encode the difference of resources in the resource request 205 or the negative resource request 220. For example, the UE 115-*a* may indicate, via a bit field (e.g., including a fixed quantity of bits) in the resource request 205 or the negative resource request 220, the difference of resources between the allocated resources and the desired resources. The UE 115-*a* may determine the difference of resources to request using a Lloyd algorithm for a best rate-distortion point. Additionally, or alternatively, the UE 115-*a* may perform a non-uniform quantization step using a companding function to transfer the Gaussian distribution to a uniform distribution for the difference of resources. The UE 115-*a* may transmit the encoded difference of resources to the network entity 105-*a* via the resource request 205 or the negative resource request 220. Based on the indicated difference of resources (e.g., a positive value or a negative value), the network entity 105-*a* may configure a resource grant, modify a previously-configured resource grant, cancel a previously-configured resource grant, or any combination thereof.

In some other cases, the UE 115-*a* and the network entity 105-*a* may negotiate a first threshold (e.g., minimum) quantity of resources, a second threshold (e.g., maximum) quantity of resources, or both based on traffic conditions of a sidelink channel (e.g., using a maximum BSR size, a minimum MCS value, a quantity of repetitions, or any other parameters). For example, the network entity 105-*a* may allocate a first quantity of resources (e.g., X resources, such as X resource elements, X resource blocks (RBs)) based on an estimated MCS value for the UE 115-*a*. The UE 115-*a* may determine if the first quantity of allocated resources is larger or smaller than an estimated quantity of resources for sidelink communications at the UE 115-*a* (e.g., Y resources). For example, if the first quantity of allocated resources is smaller than the predicted quantity of resources (e.g., X<Y), the UE 115-*a* may indicate that X<Y to the network entity 105-*a*. The network entity 105-*a* may set a minimum quantity of resources for allocation to the UE 115-*a* equal to the first allocated quantity of resources (e.g., #MinRE=X) and may calculate the bi-section for the updated set of resources based on the updated minimum quantity of resources and the maximum quantity of resources to determine an updated resource allocation (e.g., X=(X+#MaxRE)/2).

In some other cases, the UE 115-*a* may determine that the first quantity of allocated resources is greater than the predicted quantity of resources (e.g., X>Y) and may indicate that X>Y to the network entity 105-*a*. The network entity 105-*a* may set a maximum quantity of resources for allocation to the UE 115-*a* equal to the first allocated quantity of resources (e.g., #MaxRE=X) and may calculate the bi-section for the updated set of resources based on the updated maximum quantity of resources and the minimum quantity of resources to determine an updated resource allocation (e.g., X=(X+#MinRE)/2). In some examples, the UE 115-*a* may indicate via control signaling (e.g., PUCCH feedback)

an indication (e.g., a multiple-bit indication) to modify the bi-sectional denominator to converge the calculations relatively faster (e.g., change the 2 to a 4 or 8 for faster convergence on a quantity of resources to allocate).

The network entity 105-a may allocate the updated quantity of resources, X, to the UE 115-a and repeat the process iteratively, for example, until the quantity of allocated resources is within a threshold range of the estimated quantity of resources for sidelink communications for the UE 115-a (e.g., based on the UE's expected total BSR to other UEs, the UE's expected total BSR from other UEs, or both). Once the quantity of allocated resources satisfies a condition (e.g., $Y=X\pm\Delta$, where $\Delta$ is a threshold value the UE 115-a may handle via rate-matching), the UE 115-a may transmit an indication to the network entity 105-a indicating the allocated resources are sufficient for the sidelink communication resource allocation for the UE 115-a.

The allocated resources may support communication of multiple TBs 215 (e.g., in different subsets of the allocated resources). For example, because the DCI message 210 refrains from indicating an HPN, an NDI, or both for the allocated resources, the UE 115-a may use the allocated resources for multiple TBs rather than one TB mapped to the indicated HPN. Additionally, or alternatively, the UE 115-a may flexibly retransmit TBs 215 in any resources of the allocated resources rather than retransmit based on receiving a specific HPN indicating a previously-transmitted TB 215 and a specific NDI value indicating not to transmit new data (e.g., indicating to retransmit data).

Figure 3:
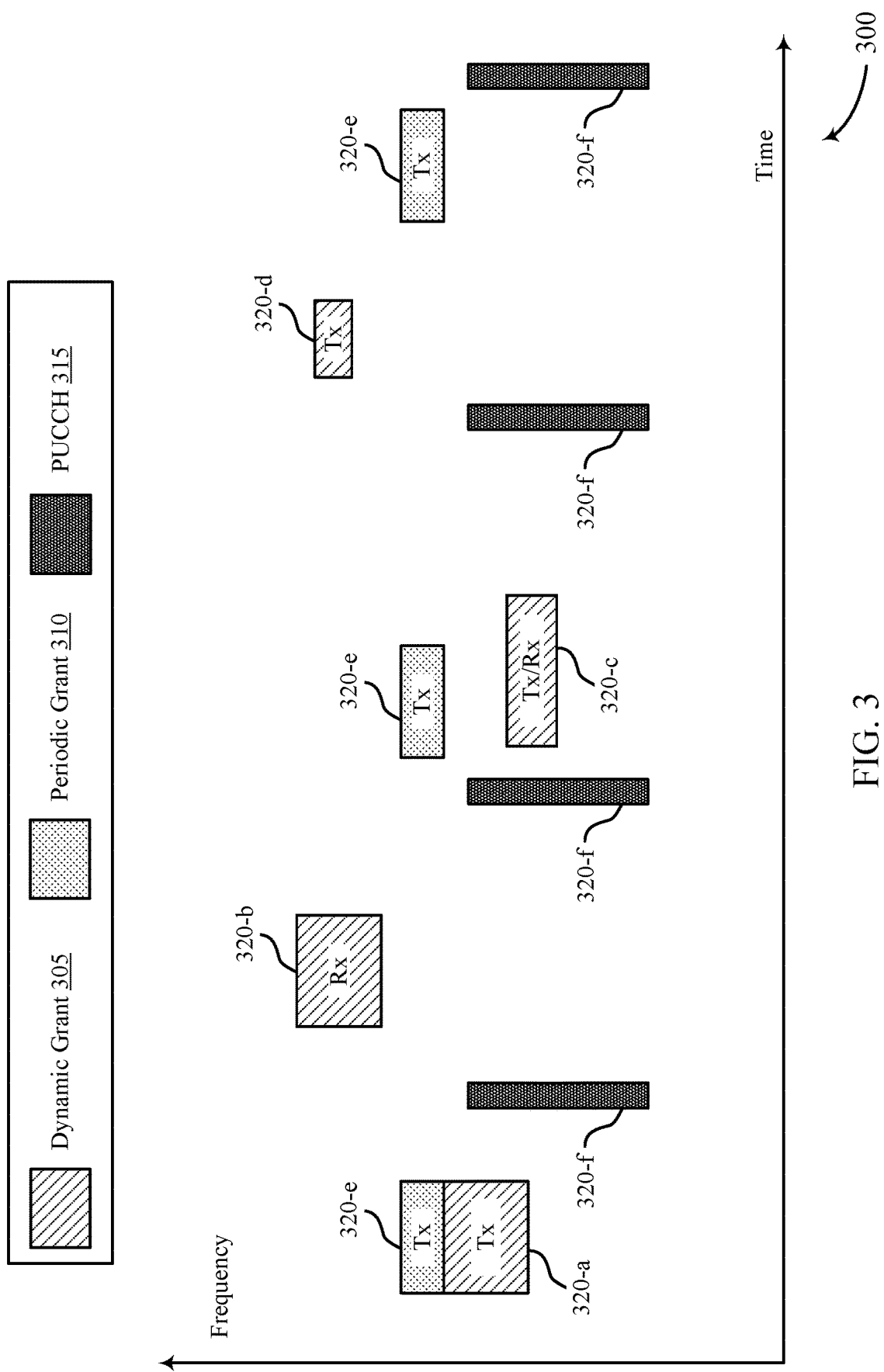
FIGS. 3, 4A, and 4B illustrate examples of resource allocations that support a multiple TB grant for sidelink in accordance with one or more aspects of the present disclosure.

FIG. 3 illustrates an example of a resource allocation 300 that supports a multiple TB grant for sidelink in accordance with one or more aspects of the present disclosure. The resource allocation 300 may implement or be implemented by aspects of the wireless communications system 100, the wireless communications system 200, or both as described with reference to FIGS. 1 and 2. The resource allocation 300 may be configured for a UE 115 by a network entity 105, which may be examples of corresponding devices described herein with reference to FIGS. 1 and 2.

The network entity 105 may allocate resources to the UE 115 for sidelink transmission, sidelink reception, or both. For example, the network entity 105 may allocate the resources using a DCI message transmitted to the UE 115. The DCI message may allocate the resources using a dynamic grant 305 (e.g., a dynamic grant-like, or one-shot, resource allocation), a periodic grant 310 (a CG-like resource allocation), or a combination thereof. In some cases, the network entity 105 may additionally configure the UE 115 with resources for a PUCCH 315 (e.g., for uplink control information (UCI) signaling) in the DCI message or in other control signaling. Rather than provide TB-based resource allocation using the DCI message (e.g., the DCI message does not indicate the resources allocated for communicating one TB), the network entity 105 may provide a sidelink resource allocation using the DCI message for communicating any quantity of TBs (e.g., for transmission by a UE 115, reception by the UE 115, or both).

The network entity 105 may indicate specific parameters for the sidelink resource allocation in the DCI message via resource allocation fields. For example, the resource allocation fields of the DCI message may include a time gap field, a frequency domain resource allocation (FDRA) field, a time domain resource allocation (TDRA) field, a periodicity field (e.g., for a periodic grant), or some combination of these or other resource allocation fields. The time gap field may indicate a duration of time after receiving the DCI message for the UE 115 to implement the allocation of resources. The FDRA field may indicate a set of frequency resources (e.g., sub-bands, sub-carriers, RBs, resource elements) allocated to the UE 115 for sidelink communications. The TDRA field may indicate a set of time resources (e.g., slots, sub-slots, symbols, timestamps) allocated to the UE 115 for sidelink communications. In some examples, the DCI message may include multiple FDRA-TDRA value pairs indicating multiple sets of allocated resources. For example, a first FDRA-TDRA value pair may indicate a first contiguous set of resources (e.g., time and frequency resources) allocated to the UE 115 for sidelink communications, and a second FDRA-TDRA value pair may indicate a second contiguous set of resources allocated to the UE 115 for sidelink communications, where the first and second sets of resources may be contiguous or non-contiguous from one another. The periodicity field may indicate a periodicity in the time domain at which a set of resources is allocated to the UE 115 for sidelink communications.

In some cases, the network entity 105 may allocate the UE 115 with multiple resource sets of different sizes (e.g., for retransmission of one or more TBs) using a dynamic grant 305. Additionally, or alternatively, to distinguish between a dynamic grant 305 and a periodic grant 310 in one or more DCI messages, the network entity 105 may use different CRC-scrambling sequences (e.g., for a DCI message including a dynamic grant 305 versus a DCI message including a periodic grant 310). Additionally, or alternatively, the network entity 105 may use dedicated codepoints to indicate either a dynamic grant 305 or a periodic grant 310. For example, the network entity 105 may include a field in the DCI message associated with a resource allocation and indicating that the resource allocation is a dynamic grant 305 or a periodic grant 310. Additionally, or alternatively, the DCI message may include two sets of TDRA and FDRA fields to support mixed dynamic and periodic grants within a single DCI message. For example, the first set of TDRA and FDRA fields may indicate time and frequency resources for dynamic grants 305 and the second set of TDRA and FDRA fields may indicate time and frequency resources for periodic grants 310. In some cases, the network entity 105 may support a CG type-1 resource allocation for sidelink using RRC signaling. For example, the RRC signaling may indicate a periodic grant 310 of resources for sidelink communication (e.g., sidelink transmission, sidelink reception, or both for one or more TBs).

The network entity 105 may indicate, in the DCI message sent to the UE 115, whether allocated resources are configured for sidelink transmission, sidelink reception, or both for the UE 115. For example, the network entity 105 may indicate if a set of resources is allocated for transmission, reception, or both via dedicated codepoints (e.g., a bit field indicating transmission, reception, or both) or CRC-scrambling (e.g., a CRC-scrambling sequence indication transmission, reception, or both). In some cases, the network entity 105 may allocate multiple sets of resources to the UE 115 for transmitting TBs via sidelink and receiving TBs via sidelink in one DCI message.

For example, the network entity 105 may transmit a DCI message to a UE 115 including one or more dynamic grants 305 of resources, one or more periodic grants 310 of resources, one or more grants of PUCCH 315 resources, or any combination thereof. The DCI message may include a dynamic grant 305 for a first set of resources 320-a configured for sidelink transmission by the UE 115. For example, a first TDRA field and a first FDRA field may indicate the time resources and frequency resources of the first set of resources 320-a. Additionally, a value in a field associated with the first TDRA field and the first FDRA field may indicate that the first set of resources 320-*a* is configured for sidelink transmission. The UE 115 may transmit one or more TBs to one or more other UEs 115 using the resources of the first set of resources 320-*a*.

The DCI message may additionally include a dynamic grant 305 for a second set of resources 320-*b* configured for sidelink reception by the UE 115. The UE 115 may transmit to one or more other UEs 115, an indication of the second set of resources 320-*b* or an indication of a subset of the second set of resources 320-*b*. The UE 115 may receive one or more TBs from one or more other UEs 115 using the resources of the second set of resources 320-*b* (e.g., in response to the UE 115 indicating resources configured for sidelink reception at the UE 115 to the other UEs 115). The DCI message may further include a dynamic grant 305 for a third set of resources 320-*c* configured for sidelink transmission, sidelink reception, or both by the UE 115. The UE 115 may transmit one or more TBs in resources of the third set of resources 320-*c*, receive one or more TBs in resources of the third set of resources 320-*c*, or both. In some cases, the DCI message may further include a dynamic grant 305 for a fourth set of resources 320-*d* configured for sidelink transmission.

Additionally, or alternatively, the DCI message may include a periodic grant 310 for a fifth set of resources 320-*e* allocated to the UE 115 periodically in time. The periodic grant 310 may configure the fifth set of resources 320-*e* for sidelink transmission by the UE 115. In some cases, the DCI message may include multiple periodic grants 310 of resources for sidelink transmission, sidelink reception, or both according to the same or different periodicities. In some examples, the periodicity field in the DCI message may indicate whether a grant of resources is a dynamic grant 305 (e.g., if the periodicity field is set to zero or some other default value) or a periodic grant 310 (e.g., if the periodicity field is set to a non-zero or non-default value).

Additionally, or alternatively, the DCI message may include a grant of PUCCH 315 resources (e.g., a dynamically or periodically). For example, the DCI message may periodically grant a sixth set of resources 320-*f* for PUCCH 315 according to a periodicity. In some examples, the UE 115 may use the PUCCH 315 to transmit feedback to the network entity 105. For example, the UE 115 may acknowledge successful reception of the DCI message using resources configured for PUCCH 315.

In some cases, the UE 115 may manage feedback (e.g., HARQ feedback for TBs) with other UEs 115 independent of the network. For example, if the UE 115 receives a negative acknowledgment (NACK) or otherwise fails to receive a positive acknowledgment (ACK) from another UE 115 for a TB transmitted via sidelink, the UE 115 may determine to retransmit the TB to the other UE 115. Rather than request a resource allocation from the network entity 105 specifically for retransmitting the TB, the UE 115 may retransmit the TB in any resources allocated to the UE 115 for sidelink transmission (e.g., the fourth set of resources 320-*d*). Accordingly, the UE 115 may effectively reduce the latency and signaling overhead involved in retransmitting a TB, for example, by refraining from requesting resources specifically configured for the TB retransmission and instead opportunistically selecting resources allocated to the UE 115 (e.g., previously allocated to the UE 115) to retransmit the TB. Such HARQ feedback for TBs and retransmission of TBs via sidelink may be transparent to the network (e.g., managed by the UEs 115).

The techniques described herein may enable the network entity 105 and the UE 115 to flexibly manage resource allocation for sidelink communications. For example, a UE 115 may indicate, via a PUCCH 315 to the network entity 105, a request for modification of resources allocated for sidelink transmission, sidelink reception, or both at the UE 115. The network entity 105 may allocate resources to the UE 115 based on the indication, for example, using a dynamic grant 305, a periodic grant 310, or both indicated in a DCI message. The UE 115 may use the allocated resources to transmit or receive one or more TBs via sidelink. The latency involved in scheduling resources for sidelink communications may decrease, for example, based on the UE 115 communicating multiple TBs (e.g., transmitting one or more TBs, receiving one or more TBs) via sidelink according to a single DCI message.

Figure 4A:
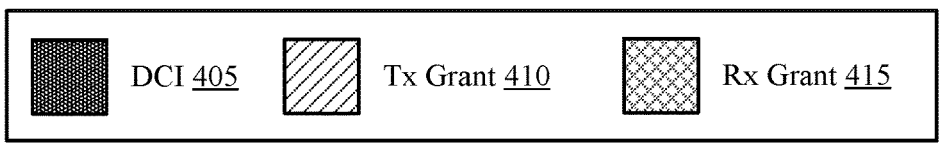
Figure 4A:
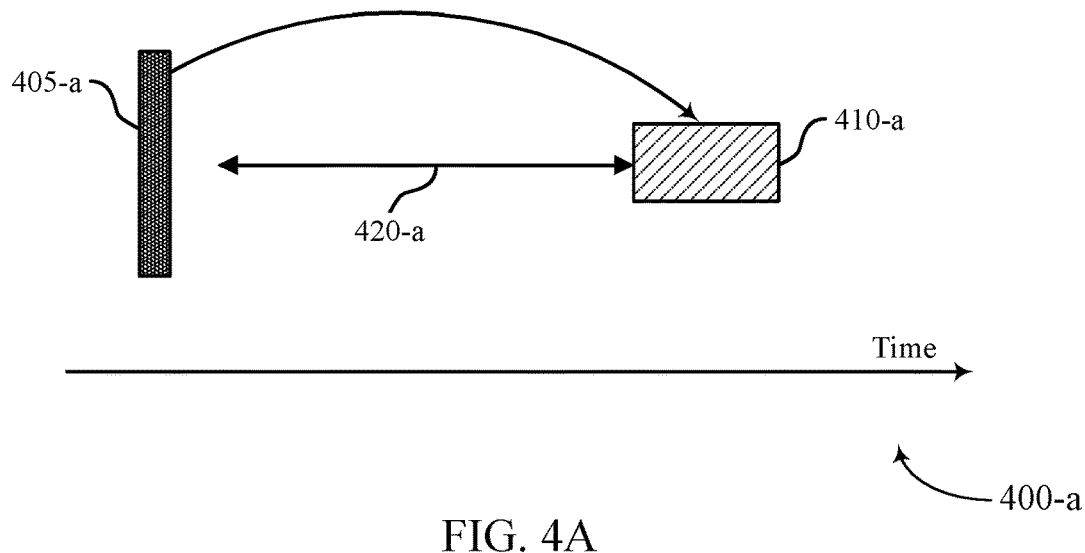
Figure 4B:
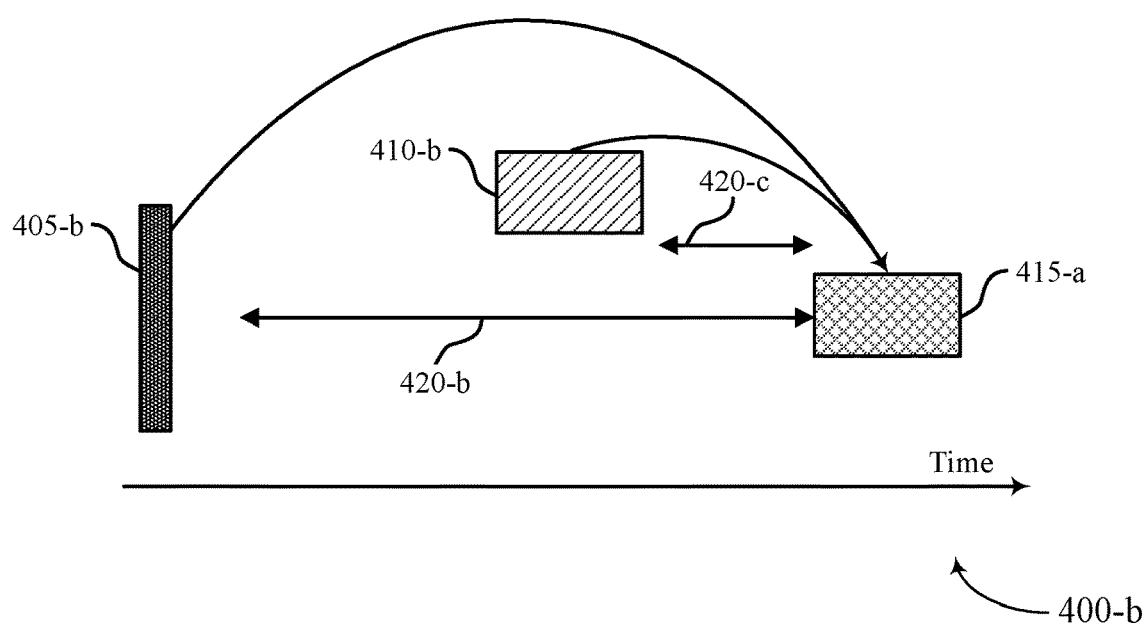

FIGS. 4A and 4B illustrate examples of resource allocations 400-*a* and 400-*b* that support a multiple TB grant for sidelink in accordance with one or more aspects of the present disclosure. The resource allocation 400-*a* and the resource allocation 400-*b* may implement or be implemented by aspects of the wireless communications system 100, the wireless communications system 200, the resource allocation 300, or any combination thereof. For example, the resource allocation 400-*a* and the resource allocation 400-*b* may involve reception of a DCI message 405, which may be an example of a corresponding DCI message described herein. Furthermore, the resource allocation 400-*a* and the resource allocation 400-*b* may be configured by a network entity 105 for a UE 115, which may be examples of corresponding devices described herein with reference to FIGS. 1 through 3.

In some examples, a network entity 105 may modify or cancel (e.g., deactivate) a sidelink resource allocation grant (e.g., a sidelink transmission grant 410, a sidelink reception grant 415) using a grant index. For example, the network entity 105 may associate each sidelink resource allocation grant (e.g., dynamic grant, periodic grant, or a combination of the two) with a grant index. A DCI message configuring a sidelink resource allocation grant may include a grant index field assigning the grant index for a resource allocation. To modify or cancel the resource allocation, the network entity 105 may transmit a second DCI message indicating the same grant index associated with a different resource allocation. For example, the network entity 105 may set the TDRA and FDRA fields in the DCI message to a default value (e.g., all zeroes, all ones) to indicate cancellation or deactivation of a grant. Alternatively, the network entity 105 may indicate the same grant index and may set the TDRA and FDRA fields to different values to indicate a modified allocation of resources for the previously configured grant. In some cases, the network entity 105 may support modifying or canceling periodic grants, but may refrain from—or otherwise not support—modifying or canceling dynamic grants.

In the example of the resource allocation 400-*a*, the UE 115 may receive a DCI message 405-*a* that includes a modification or cancellation request for a transmission grant 410-*a*. For example, the DCI message 405-*a* may include a grant index value indicating the previously allocated transmission grant 410-*a*. The UE 115 may receive the DCI message 405-*a* canceling or modifying the transmission grant 410-*a* a time duration X1 before the transmission grant 410-*a* is scheduled. The UE may cancel or modify the transmission grant 410-*a* based on the received DCI message 405-*a* if the DCI message 405-*a* is received at least a threshold time 420-*a* before the transmission grant 410-*a* is scheduled. For example, if X1 is greater than the threshold time 420-a, the UE 115 may have sufficient time to process the DCI message 405-a and determine the modification to or cancelation of the transmission grant 410-a prior to the start of the transmission grant 410-a. However, the UE 115 may fail to cancel or modify the transmission grant 410-a if the request (e.g., in the DCI message 405-a) is not received at least the threshold time 420-a prior to the transmission grant 410-a, for example, because the UE 115 may not have enough time to process the DCI message 405-a and determine to modify or cancel the transmission grant 410-a prior to the start of the transmission grant 410-a. The length of the threshold time 420-a may be different depending on the type of grant (e.g., sidelink transmission grant or sidelink reception grant). In some examples, the length of the threshold time 420-a may depend on one or more capabilities (e.g., a processing capability) of the UE 115. In some cases, the network may configure the threshold time 420-a and may determine whether to transmit a DCI message 405 modifying or canceling a transmission grant 410 for sidelink based on the threshold time 420-a.

In the example of the resource allocation 400-b, the network entity 105 may modify or cancel a reception grant 415-a via a DCI message 405-b. For example, the network entity 105 may transmit the DCI message 405-b indicating modification or cancellation of the reception grant 415-a to a first UE 115 a time duration X2 prior to the reception grant 415-a. The first UE 115 may transmit an indication of the modification or cancellation of the reception grant 415-a (e.g., using resources allocated in a transmission grant 410-b) to a second UE 115 configured to transmit using resources allocated in the reception grant 415-a. The first UE 115 may transmit the indication of the modification or cancellation in resources a time duration X3 prior to the start of the reception grant 415-a. The second UE 115 may cancel or modify the reception grant 415-a according to the received indication from the first UE 115. However, the network entity 105 may not indicate modification or cancelation of the reception grant 415-a if the DCI message 405-b is not transmitted at least a threshold time 420-b prior to the reception grant 415-a. Additionally, the network entity 105 may not indicate modification or cancelation of the reception grant 415-a if the resources allocated using the transmission grant 410-b are less than a threshold time 420-c prior to the reception grant 415-a. Using the first threshold time 420-b and the second threshold time 420-c may allow the first UE 115 and the second UE 115 to have sufficient time to modify or cancel the scheduled reception grant 415-a. In some examples, a length of the first threshold time 420-b, a length of the second threshold time 420-c, or both may be based on UE capabilities (e.g., a capability of a UE 115 to process a DCI message 405, a capability of a UE 115 to process an indication of a grant modification or cancellation via sidelink). Additionally, or alternatively, the network entity 105 may use the first threshold time 420-b, the second threshold time 420-c, or both to determine whether modification or cancellation of a reception grant 415 is supported. For example, if the first UE 115 is not configured with a sidelink transmission resource allocation at least the second threshold time 420-c before the resources allocated for sidelink reception using the reception grant 415, the network entity 105 may refrain from indicating to modify or cancel the reception grant 415.

In some cases, a PUCCH resource indicator (PRI) may be included in a DCI message 405 indicating resources for a UE 115 receiving the DCI message 405 to use for acknowledging successful or unsuccessful reception of the DCI message 405 (e.g., for HARQ feedback). In some such cases, the PRI may be used for periodic grants, dynamic grants, dynamic grants satisfying a resource threshold (e.g., allocating greater than a threshold quantity of resources to a UE 115 for sidelink communications), or some combination thereof. The UE 115 may transmit HARQ feedback for the DCI message 405 to the network entity 105 using resources indicated by the PRI, and the network entity 105 may determine whether to retransmit the DCI message 405 based on the HARQ feedback. Additionally, or alternatively, the network entity 105 may configure PUCCH resources (e.g., via a DCI message 405) for the UE 115 to use to request additional (or fewer) resources for sidelink communication (e.g., using an SR or BSR).

Figure 5:
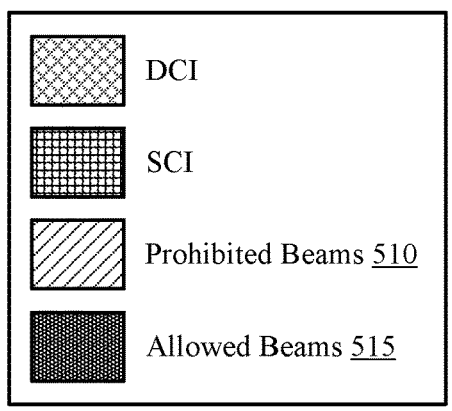
FIG. 5 illustrates an example of a wireless communications system that supports a multiple TB grant for sidelink in accordance with one or more aspects of the present disclosure.
Figure 5:
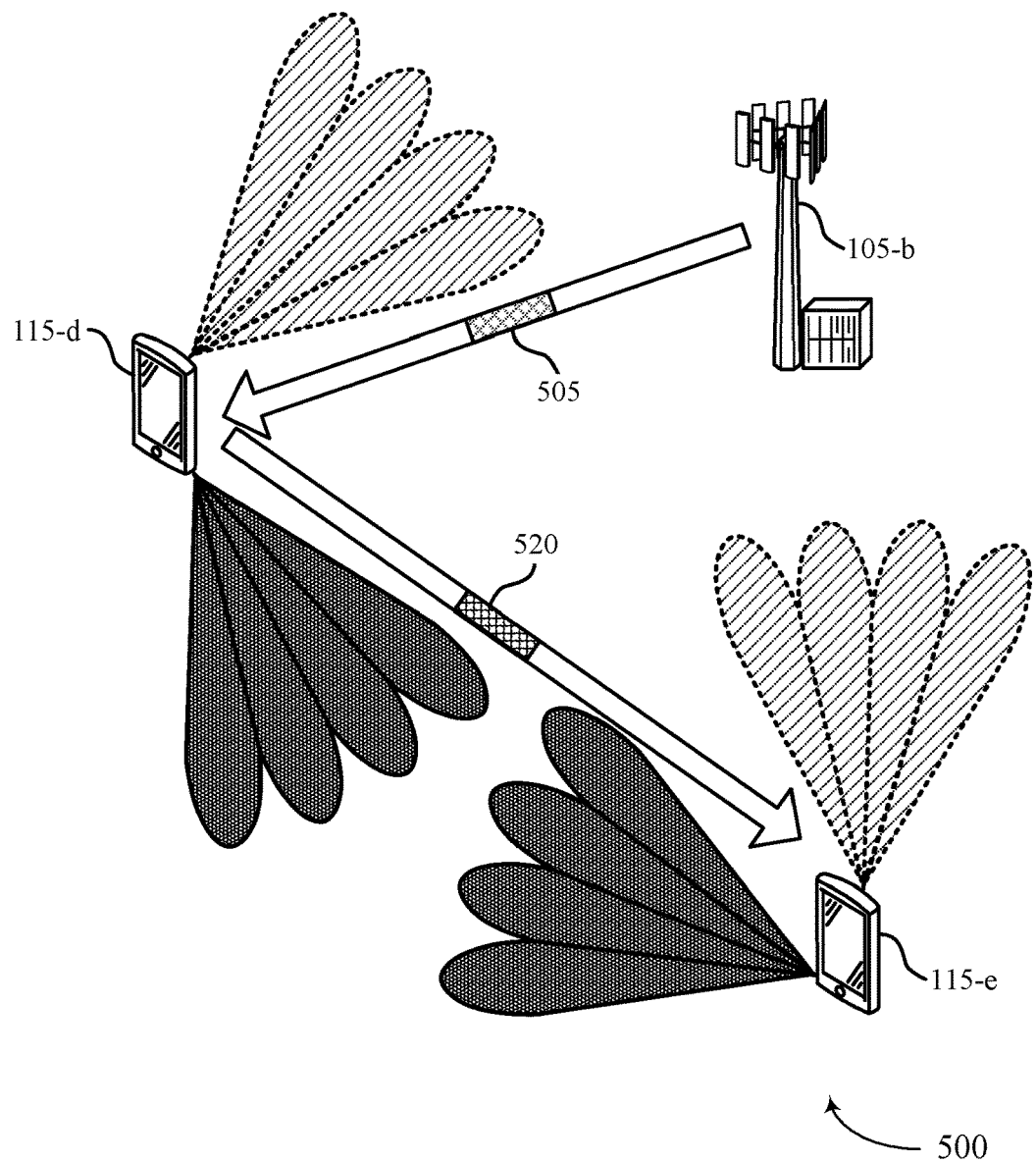

FIG. 5 illustrates an example of a wireless communications system 500 that supports a multiple TB grant for sidelink in accordance with one or more aspects of the present disclosure. The wireless communications system 500 may implement or be implemented by aspects of the wireless communications system 100, the wireless communications system 200, the resource allocation 300, the resource allocation 400-a, the resource allocation 400-b, or some combination thereof. For example, the wireless communications system 500 may include a network entity 105-b, which may be an example of corresponding network entities with reference to FIGS. 1 through 4B. Likewise, the wireless communications system 500 may include a UE 115-d and a UE 115-e, which may be examples of UEs 115 described herein with reference to FIGS. 1 through 4B.

In some examples of enhanced resource allocation in sidelink mode 1, the network entity 105-b may specify parameters for (e.g., restrictions on) provided resources. For example, the network entity 105-b may indicate parameters for transmission power, beamforming, or both to the UE 115-d via fields in a DCI message 505 or another control signal. The UE 115-d may transmit TBs in a set of granted resources allocated for sidelink communications using a transmit power and a transmit beam based on a maximum transmit power and supported beam directions indicated by the network entity 105-b (e.g., in a DCI message 505).

For example, the network entity 105-b may indicate to the UE 115-d prohibited beams 510 for sidelink transmission between the UE 115-d and the UE 115-e. In some cases, the UE 115-d may coordinate with the UE 115-e regarding prohibited beams 510, allowed beams 515, or both for sidelink communications. For example, the UE 115-d may indicate prohibited beams 510, allowed beams 515, or both to the UE 115-e via SCI 520. In some examples, the network entity 105-b may prohibit beams directed from UEs 115 in the relative direction of the network entity 105-b. A first UE 115-d may receive the DCI message 505 prohibiting the beams and may relay the information to one or more other UEs 115 (e.g., UE 115-e) via SCI 520 or other sidelink signaling.

In some cases, the DCI message 505 granting resources for sidelink communications may include a field indicating a maximum transmit power for the granted resources. Additionally, or alternatively, the DCI message 505 may include a field indicating set of prohibited beams 510 (e.g., prohibited beam indexes), set of allowed beams 515 (e.g., allowed beam indexes), a set of prohibited beam directions, a set of allowed beam directions, a set of prohibited beam widths, a set of allowed beam widths, or any other beamforming parameters. In some cases, the network entity 105-b may indicate different maximum transmit powers, different beamforming parameters, or both for sidelink transmission grant and sidelink reception grants.

Additionally, or alternatively, the network entity 105-*b* may configure sidelink CSI-RS resources for one or more UEs 115. The network entity 105-*b* may configure sidelink CSI-RS resources using control signaling, such as RRC signaling, a MAC control element (CE), a DCI message 505, or any combination thereof. For example, the network entity 105-*b* may use DCI to configure aperiodic (e.g., dynamic) sidelink CSI-RSs and may use a MAC-CE or RRC signaling to configure periodic sidelink CSI-RSs. The control signaling may include one or more fields specifying sidelink CSI-RS ports, code division multiplexing (CDM) groups, wideband transmission, or some combination thereof. For example, the network entity 105-*b* may configure sidelink CSI-RS resources to be wideband and periodic, occupying a relatively small quantity of symbols in time. The UE 115-*d*, the UE 115-*e*, or both may use the configured sidelink CSI-RSs to determine channel conditions for sidelink channels.

Figure 6:
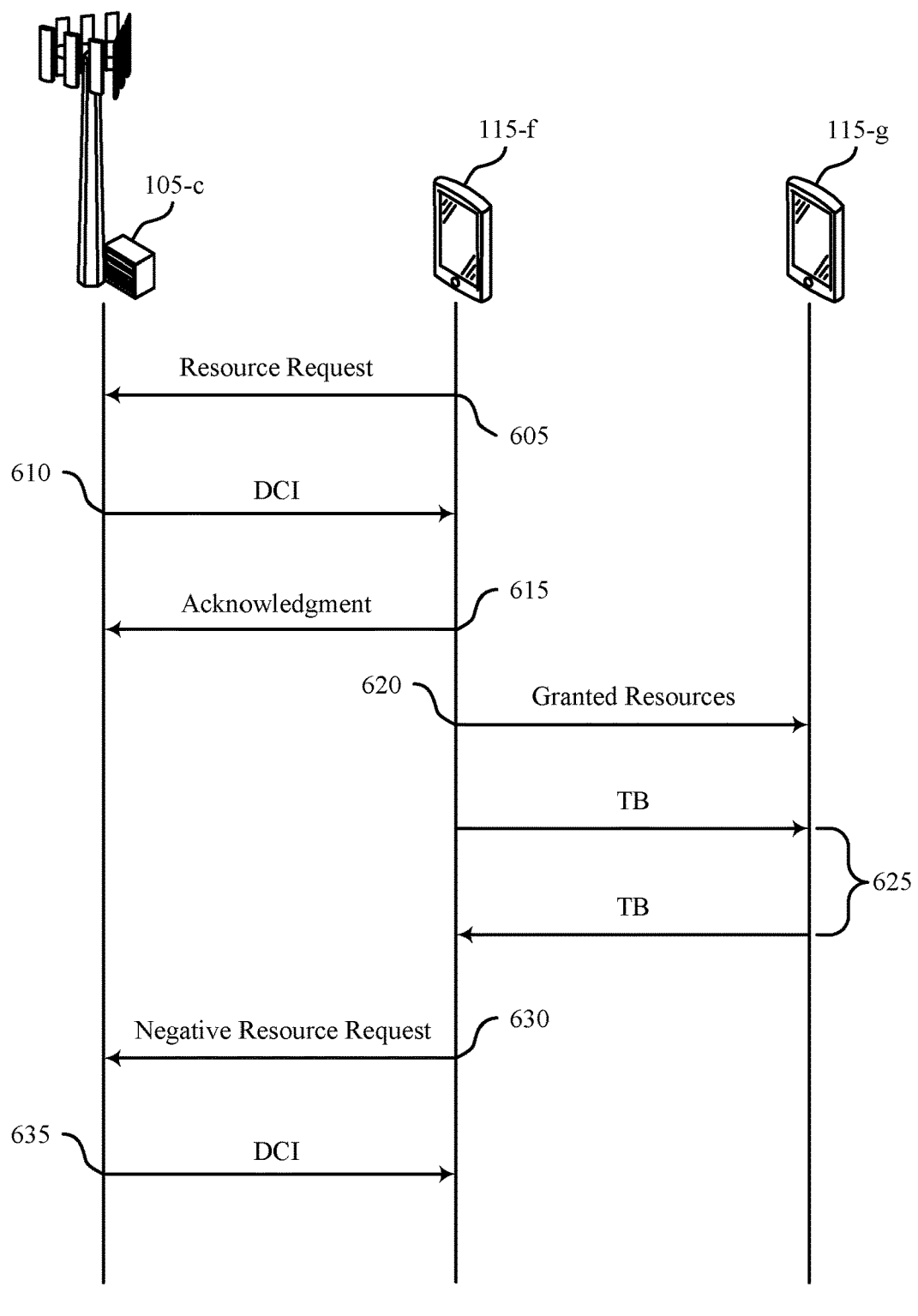
FIG. 6 illustrates an example of a process flow that supports a multiple TB grant for sidelink in accordance with one or more aspects of the present disclosure.

FIG. 6 illustrates an example of a process flow 600 that supports a multiple TB grant for sidelink in accordance with one or more aspects of the present disclosure. The process flow 600 may implement or be implemented by aspects of the wireless communications system 100, the wireless communications system 200, the resource allocation 300, the resource allocation 400-*a*, the resource allocation 400-*b*, the wireless communications system 500, or any combination thereof. For example, the process flow 600 may include a network entity 105-*c*, a UE 115-*f*, and a UE 115-*g*, which may be examples of corresponding devices described herein with reference to FIGS. 1 through 5. In the following description of the process flow 600, the operations performed by the devices may be performed in different orders or at different times. Additionally, or alternatively, some operations may be omitted from the process flow 600, and other operations may be added to the process flow 600.

At 605, the UE 115-*f* may transmit, and the network entity 105-*c* may receive, a first signal requesting a modification of allocated resources for sidelink transmission, sidelink reception, or both based on multiple TBs. For example, the UE 115-*f* may store, in a buffer, multiple TBs for transmission to one or more other UEs 115. Additionally, or alternatively, the UE 115-*f* may determine or predict a quantity of TBs—or a corresponding quantity of data—to be received at the UE 115-*f* from other UEs 115. In some cases, the UE 115-*f* may generate an accumulated BSR based on a quantity of information stored using a buffer for transmission at the UE 115-*f*. In such cases, the first signal transmitted to the network entity 105-*c* may include the accumulated BSR. In some other cases, the UE 115-*f* may generate a preemptive BSR based on a quantity of information expected for reception at the UE 115-*f* (e.g., from the UE 115-*g* or a set of other UEs 115). In such cases, the first signal transmitted to the network entity 105-*c* may include the preemptive BSR. In some cases, the first signal may indicate a negative value associated with the modification of allocated resources. For example, the UE 115-*f* may request for the network entity 105-*c* to reduce a quantity of resources allocated to the UE 115-*f* for sidelink communications (e.g., cancel a resource grant, modify a resource grant to allocate relatively fewer resources) by indicating a negative value in a BSR (e.g., using a bit field in the BSR to indicate either a request for more resources or fewer resources). Additionally, or alternatively, the UE 115-*f* may transmit an SR to request resources for sidelink communication.

At 610, the network entity 105-*c* may allocate resources to the UE 115-*f* for sidelink communications, for example, in response to the resource request. In some examples, the network entity 105-*c* may allocate a first set of resources for sidelink transmission at the UE 115-*f* based on the first signal including the accumulated BSR. Additionally, or alternatively, the network entity 105-*c* may allocate a second set of resources for sidelink reception at the UE 115-*f* based on the first signal including the preemptive BSR. The network entity 105-*c* may transmit a DCI signal granting one or more resources to the UE 115-*f* for sidelink transmission, sidelink reception, or both based on the received first signal. The DCI may grant one or more resources for communication of multiple TB s. Furthermore, the DCI may indicate a grant index corresponding to the one or more granted resources.

At 615, the UE 115-*f* may transmit, in response to the DCI, a feedback signal indicating the DCI has been received at the UE 115-*f*. At 620, the UE 115-*f* may transmit, to the UE 115-*g*, a signal indicating at least a portion of the granted resources for sidelink reception at the UE 115-*f*. By indicating the portion of the granted resources to the UE 115-*g*, the UE 115-*g* may use the indicated resources for sidelink transmission to the UE 115-*f*. Additionally, the UE 115-*f* may transmit to the UE 115-*g* one or more transmission parameters (e.g., maximum transmit power, prohibited beams, allowed beams) for sidelink transmissions from the UE 115-*g* to the UE 115-*f*. For example, the UE 115-*g* may relay such transmission parameters from the network entity 105-*c* to the UE 115-*g* or other UEs 115 in the system.

For example, the DCI may grant a first set of resources for sidelink transmission from the UE 115-*f*, a second set of resources for sidelink reception at the UE 115-*f*, a third set of resources configured for sidelink transmission, sidelink reception, or both for the UE 115-*f*, or any combination thereof. In some cases, the DCI grant may dynamically grant a first set of resources for sidelink communication, periodically grant a second set of resources for sidelink communication according to a periodicity, or both.

At 625, the UE 115-*f* and the UE 115-*g* may communicate multiple TBs via the granted resources based on the DCI. For example, the UE 115-*f* may transmit one or more first TBs to the UE 115-*g* via the granted resources. For example, the UE 115-*f* may use different subsets of the granted resources for transmitting different TBs (e.g., to the same UE 115-*g* or to different UEs 115). Similarly, the UE 115-*g* may transmit, and the UE 115-*f* may receive, one or more second TBs via the granted resources. For example, the UE 115-*f* may use different subsets of the granted resources for receiving different TBs (e.g., from the same UE 115-*g* or from different UEs 115). In some cases, the UE 115-*f* may transmit one or more TBs to the UE 115-*g* and may receive one or more TBs from the UE 115-*g* using the resources allocated by a single DCI message at 610.

In some cases, the UE 115-*f* and the UE 115-*g* may communicate the multiple TBs via the granted resources based on a transmit power indicated in the DCI. Additionally, or alternatively, the UE 115-*f* and the UE 115-*g* may communicate the multiple TBs using beams based on a set of allowed beams, a set of allowed beam directions, a set of prohibited beams, a set of prohibited beam directions, or any combination thereof indicated according to the DCI.

In some examples, at 630, the UE 115-*f* may indicate a negative resource request to the network entity 105-*c*. For example, the UE 115-*f* may request allocation of fewer resources, cancelation of a subset of the granted one or more resources, or both. At 635, the UE 115-*f* may receive a second DCI signal modifying the granted resources, deactivating the granted resources, canceling the granted resources, or any combination thereof based on the second DCI signal indicating the same grant index as the DCI signal received at 610.

Figure 7:
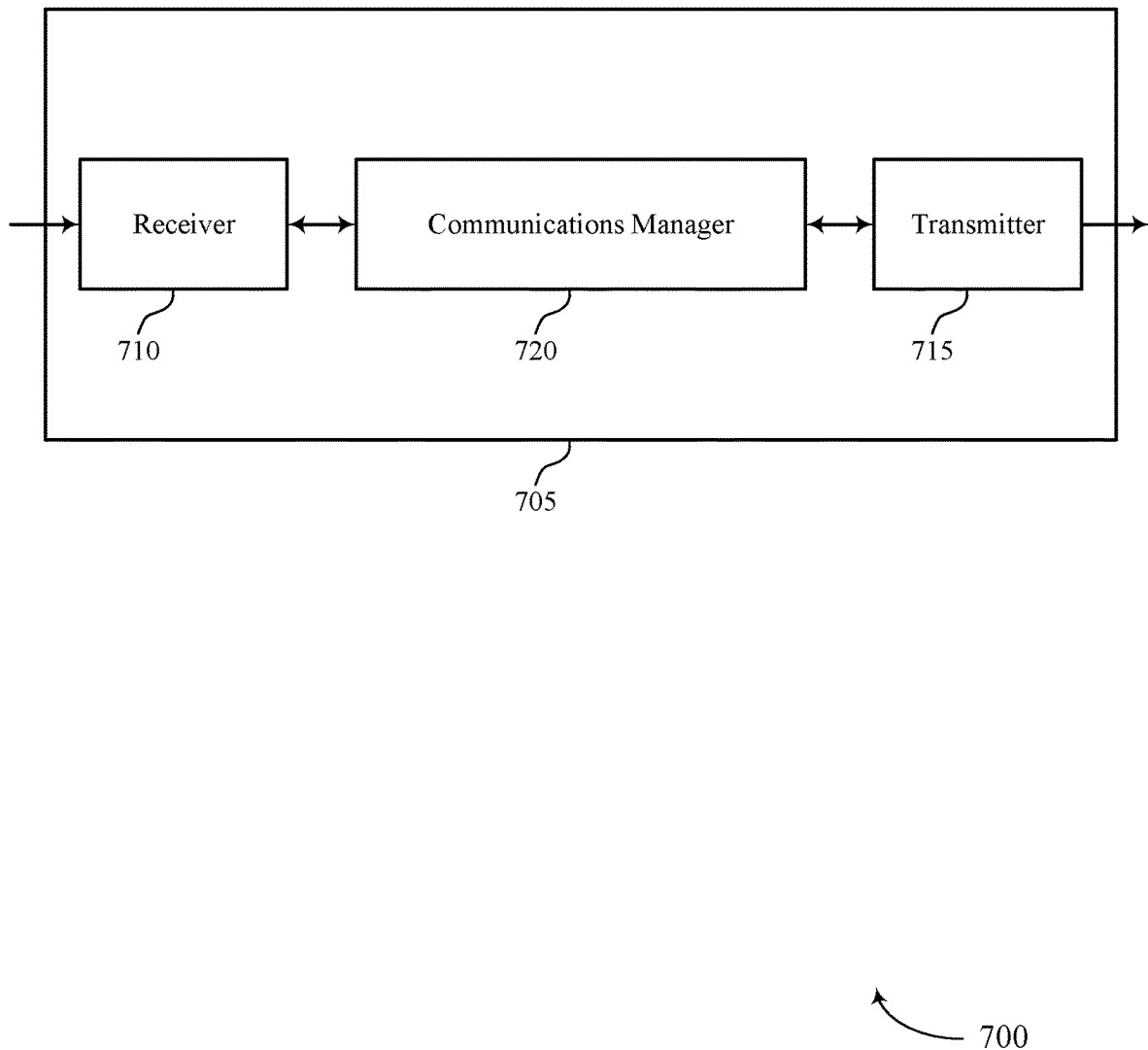
FIGS. 7 and 8 show block diagrams of devices that support a multiple TB grant for sidelink in accordance with one or more aspects of the present disclosure.

FIG. 7 shows a block diagram 700 of a device 705 that supports a multiple TB grant for sidelink in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multiple TB grants for sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiple TB grants for sidelink). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of configuring multiple TB grants for sidelink as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for transmitting a first signal requesting a modification of allocated resources for sidelink transmission, sidelink reception, or both based on multiple TBs for communication for the UE. The communications manager 720 may be configured as or otherwise support a means for receiving a DCI signal granting one or more resources to the UE for sidelink transmission, sidelink reception, or both based on the first signal, the DCI signal granting the one or more resources for communication of the multiple TBs. The communications manager 720 may be configured as or otherwise support a means for communicating, with one or more other UEs, a set of multiple TBs via the granted one or more resources based on the DCI signal.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reducing processing resources involved in receiving DCI sidelink grants. For example, to support communication of multiple TBs, the device 705 may receive and process a single DCI message and may use the resources allocated in the single DCI message for the multiple TBs.

Figure 8:
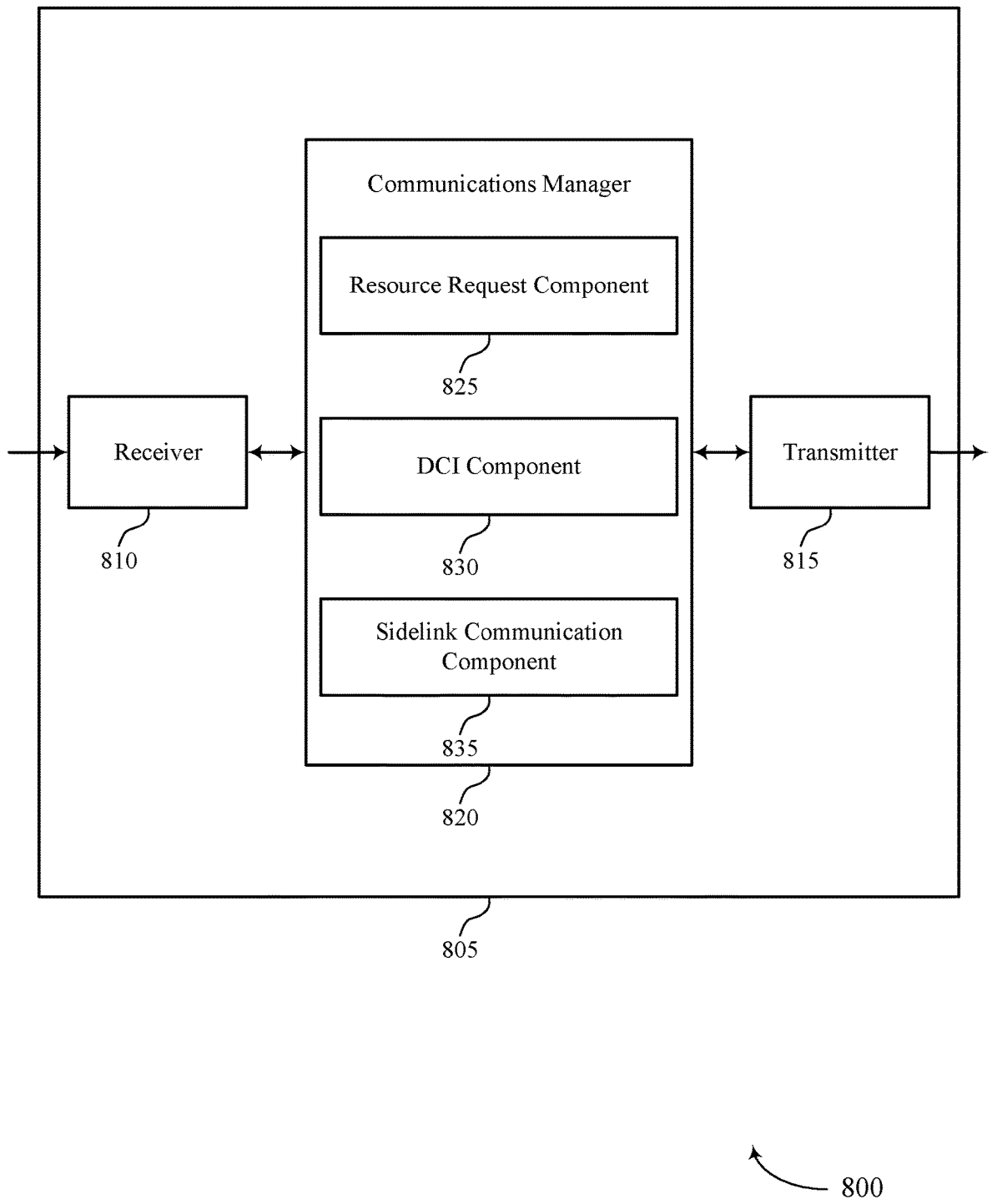

FIG. 8 shows a block diagram 800 of a device 805 that supports multiple TB grant for sidelink in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiple TB grants for sidelink). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiple TB grants for sidelink). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of configuring multiple TB grants for sidelink as described herein. For example, the communications manager 820 may include a resource request component 825, a DCI component 830, a sidelink communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The resource request component 825 may be configured as or otherwise support a means for transmitting a first signal requesting a modification of allocated resources for sidelink transmission, sidelink reception, or both based on multiple TBs for communication for the UE. The DCI component 830 may be configured as or otherwise support a means for receiving a DCI signal granting one or more resources to the UE for sidelink transmission, sidelink reception, or both based on the first signal, the DCI signal granting the one or more resources for communication of the multiple TBs. The sidelink communication component 835 may be configured as or otherwise support a means for communicating, with one or more other UEs, a set of multiple TBs via the granted one or more resources based on the DCI signal.

Figure 9:
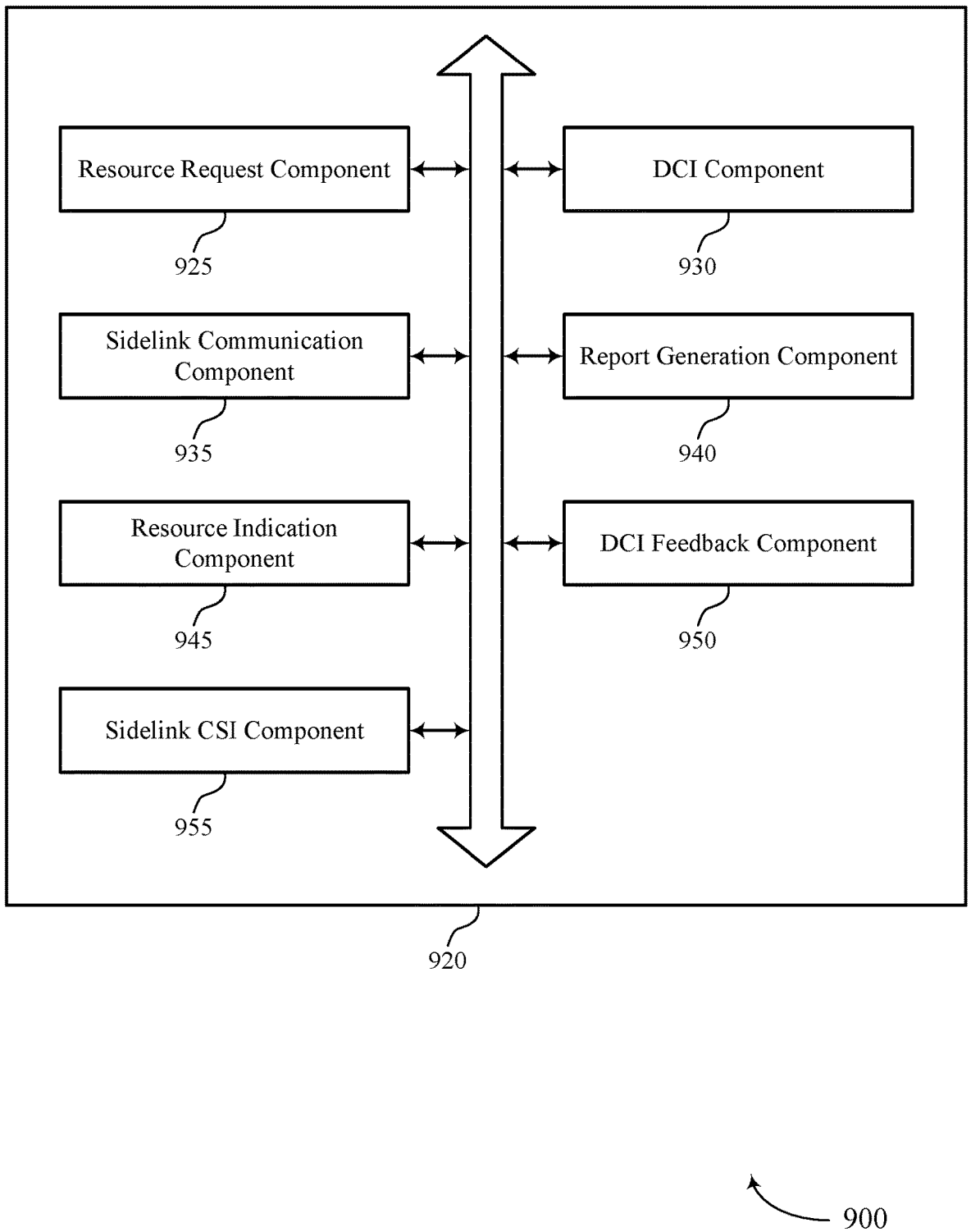
FIG. 9 shows a block diagram of a communications manager that supports a multiple TB grant for sidelink in accordance with one or more aspects of the present disclosure.

FIG. 9 shows a block diagram 900 of a communications manager 920 that supports a multiple TB grant for sidelink in accordance with one or more aspects of the present disclosure. The communications manager 920 may be an example of aspects of a communications manager 720, a communications manager 820, or both, as described herein. The communications manager 920, or various components thereof, may be an example of means for performing various aspects of configuring multiple TB grants for sidelink as described herein. For example, the communications manager 920 may include a resource request component 925, a DCI component 930, a sidelink communication component 935, a report generation component 940, a resource indication component 945, a DCI feedback component 950, a sidelink CSI component 955, or any combination thereof. Each of these components may communicate, directly or indirectly, with one another (e.g., via one or more buses).

The communications manager 920 may support wireless communications at a UE in accordance with examples as disclosed herein. The resource request component 925 may be configured as or otherwise support a means for transmitting a first signal requesting a modification of allocated resources for sidelink transmission, sidelink reception, or both based on multiple TBs for communication for the UE. The DCI component 930 may be configured as or otherwise support a means for receiving a DCI signal granting one or more resources to the UE for sidelink transmission, sidelink reception, or both based on the first signal, the DCI signal granting the one or more resources for communication of the multiple TBs. The sidelink communication component 935 may be configured as or otherwise support a means for communicating, with one or more other UEs, a set of multiple TBs via the granted one or more resources based on the DCI signal.

In some examples, the report generation component 940 may be configured as or otherwise support a means for generating an accumulated buffer status report based on a quantity of information stored using a buffer for transmission to a set of multiple other UEs, where the first signal includes the accumulated buffer status report.

In some examples, the report generation component 940 may be configured as or otherwise support a means for generating a preemptive buffer status report based on a quantity of information expected for reception at the UE from a set of multiple other UEs, where the first signal includes the preemptive buffer status report.

In some examples, the first signal indicates a negative value associated with the modification of the allocated resources. In some examples, the granted one or more resources includes a first quantity of resources that is less than a second quantity of resources corresponding to the allocated resources to be modified.

In some examples, the resource indication component 945 may be configured as or otherwise support a means for transmitting, to a second UE of the one or more other UEs, a signal indicating at least a portion of the granted one or more resources for sidelink transmission from the second UE to the UE, one of more transmission parameters for sidelink transmission from the second UE to the UE, or both, where the communicating is based on the signal.

In some examples, to support communicating, the sidelink communication component 935 may be configured as or otherwise support a means for transmitting a first TB of the set of multiple TBs via a first subset of the granted one or more resources configured for sidelink transmission that is at least a first threshold time after the DCI signal is received. In some examples, to support communicating, the sidelink communication component 935 may be configured as or otherwise support a means for receiving a second TB of the set of multiple TBs via a second subset of the granted one or more resources configured for sidelink reception that is at least a second threshold time after the DCI signal is received, the second threshold time being greater than the first threshold time.

In some examples, the DCI feedback component 950 may be configured as or otherwise support a means for transmitting, in response to the DCI signal, a feedback signal indicating that the DCI signal is received. In some examples, the feedback signal requests allocation of additional resources, cancelation of a subset of the granted one or more resources, or both based on the granted one or more resources.

In some examples, the DCI signal indicates a grant index corresponding to the granted one or more resources, and the DCI component 930 may be configured as or otherwise support a means for receiving a second DCI signal modifying the granted one or more resources, deactivating the granted one or more resources, canceling the granted one or more resources, or any combination thereof based on the second DCI signal indicating the grant index.

In some examples, to support communicating, the sidelink communication component 935 may be configured as or otherwise support a means for transmitting, to one or more first UEs, one or more first TBs via the granted one or more resources. Additionally, or alternatively, to support communicating, the sidelink communication component 935 may be configured as or otherwise support a means for receiving, from one or more second UEs, one or more second TBs via the granted one or more resources.

In some examples, to support communicating, the sidelink communication component 935 may be configured as or otherwise support a means for communicating a TB of the set of multiple TBs based on a transmit power indicated according to the DCI signal.

In some examples, to support communicating, the sidelink communication component 935 may be configured as or otherwise support a means for communicating a TB of the set of multiple TBs using a beam based on a set of allowed beams, a set of allowed beam directions, a set of prohibited beams, a set of prohibited beam directions, or any combination thereof indicated according to the DCI signal.

In some examples, to support communicating, the sidelink communication component 935 may be configured as or otherwise support a means for communicating a first TB of the set of multiple TBs via a first subset of the granted one or more resources. In some examples, to support communicating, the sidelink communication component 935 may be configured as or otherwise support a means for communicating a second TB of the set of multiple TBs via a second subset of the granted one or more resources, the first subset of the granted one or more resources being distinct from the second subset of the granted one or more resources.

In some examples, the sidelink CSI component 955 may be configured as or otherwise support a means for transmitting one or more sidelink channel state information reference signals based on the DCI signal indicating a set of resources configured for sidelink channel state information reference signals.

In some examples, the DCI signal dynamically grants a first set of resources, periodically grants a second set of resources according to a periodicity, or both. In some examples, the DCI signal grants a first set of resources for sidelink transmission from the UE, a second set of resources for sidelink reception at the UE, a third set of resources for sidelink transmission, sidelink reception, or both for the UE, or any combination thereof.

In some examples, a first TB of the set of multiple TBs corresponds to a first hybrid automatic repeat request process number, a first new data indicator, or both. In some examples, a second TB of the set of multiple TBs corresponds to a second hybrid automatic repeat request process number different from the first hybrid automatic repeat request process number, a second new data indicator different from the first new data indicator, or both.

Figure 10:
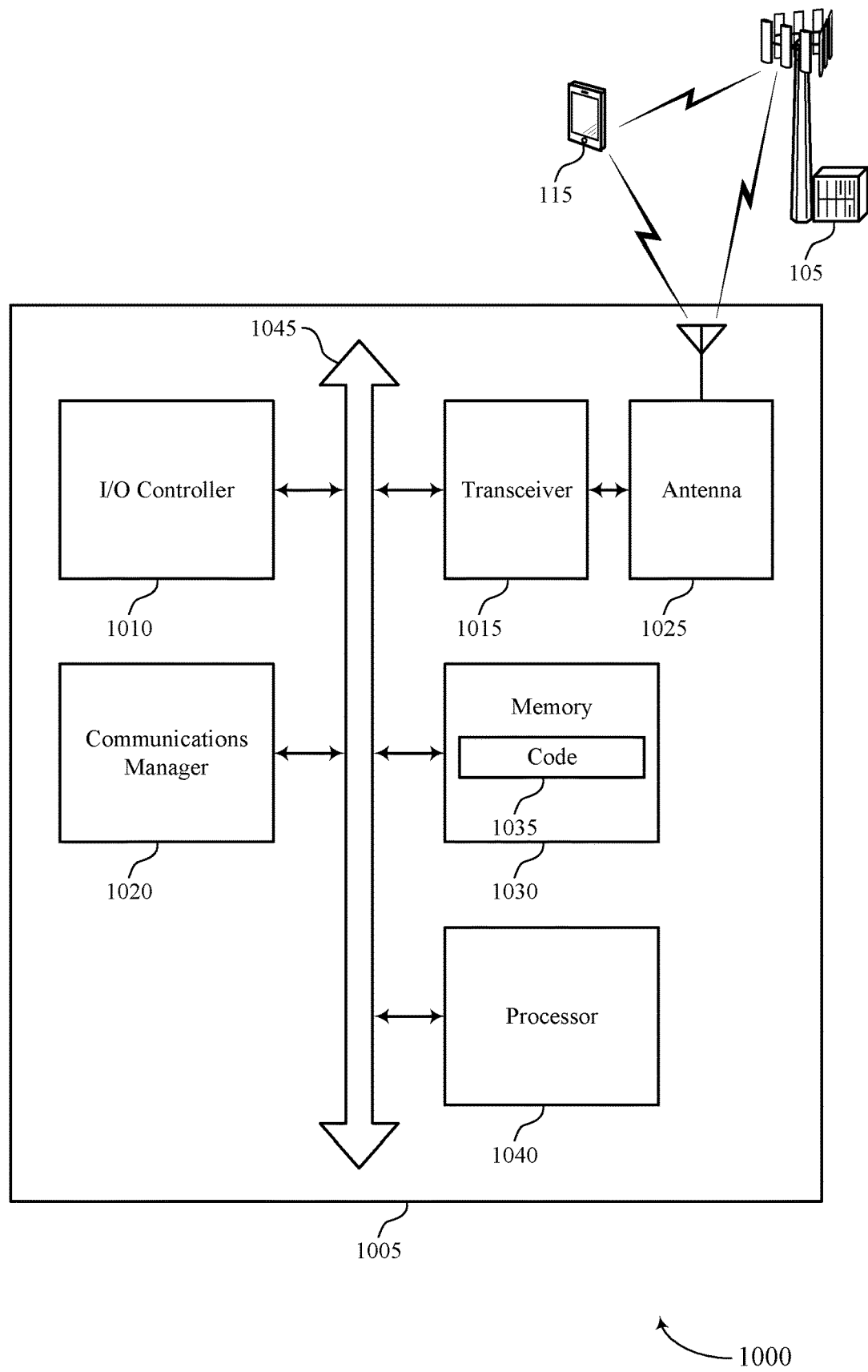
FIG. 10 shows a diagram of a system including a device that supports a multiple TB grant for sidelink in accordance with one or more aspects of the present disclosure.

FIG. 10 shows a diagram of a system 1000 including a device 1005 that supports a multiple TB grant for sidelink in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiple TB grants for sidelink). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for transmitting a first signal requesting a modification of allocated resources for sidelink transmission, sidelink reception, or both based on multiple TBs for communication for the UE. The communications manager 1020 may be configured as or otherwise support a means for receiving a DCI signal granting one or more resources to the UE for sidelink transmission, sidelink reception, or both based on the first signal, the DCI signal granting the one or more resources for communication of the multiple TBs. The communications manager 1020 may be configured as or otherwise support a means for communicating, with one or more other UEs, a set of multiple TBs via the granted one or more resources based on the DCI signal.

By including or configuring the communications manager 1020 in accordance with examples as described herein, the device 1005 may support techniques for decreasing latency and improving flexibility in scheduling sidelink communications.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of configuring multiple TB grants for sidelink as described herein, or the processor 1040 and the memory 1030 may be otherwise configured to perform or support such operations.

Figure 11:
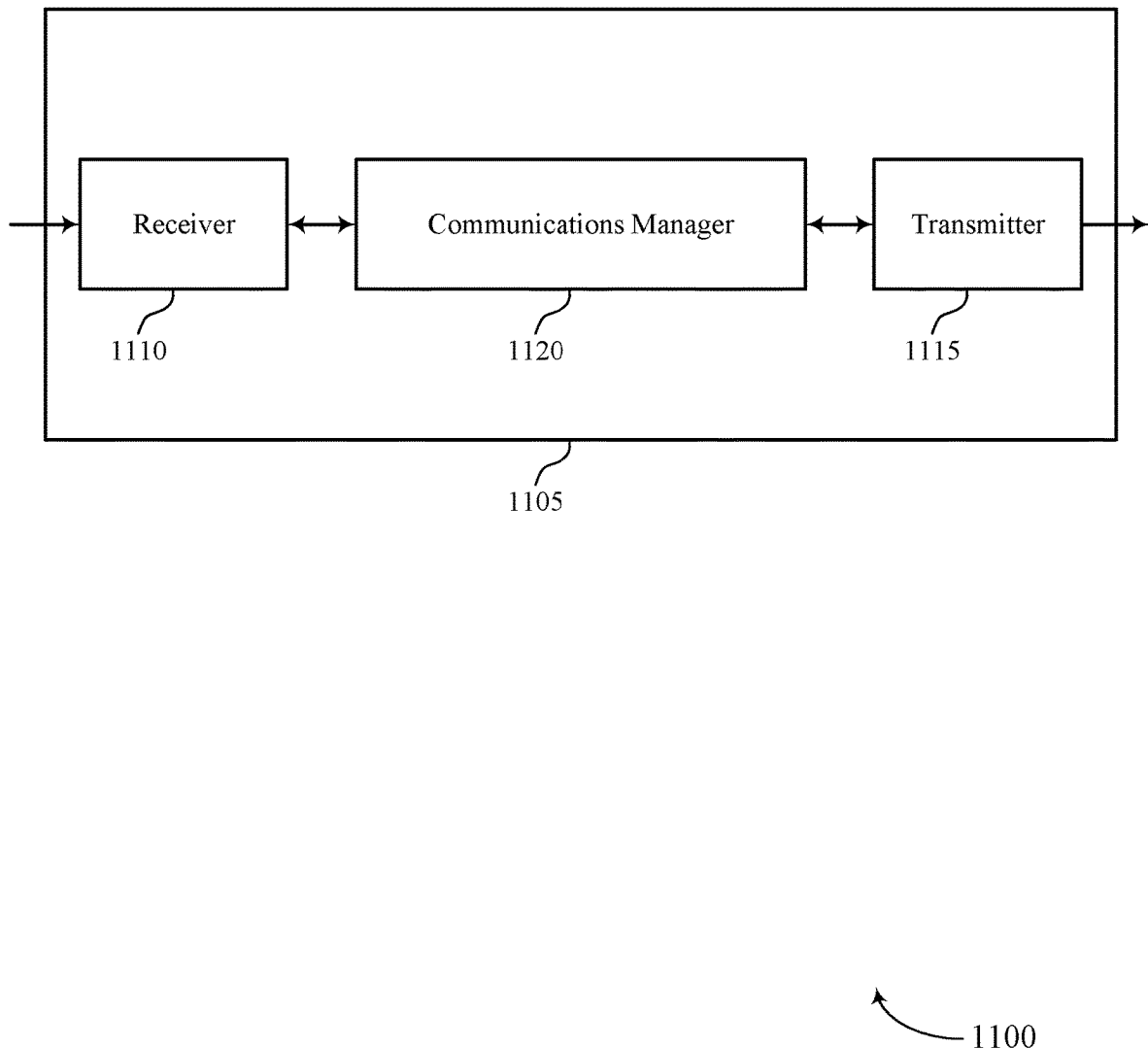
FIGS. 11 and 12 show block diagrams of devices that support a multiple TB grant for sidelink in accordance with one or more aspects of the present disclosure.

FIG. 11 shows a block diagram 1100 of a device 1105 that supports a multiple TB grant for sidelink in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of configuring multiple TB grants for sidelink as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for receiving a first signal requesting a modification of allocated resources for sidelink transmission, sidelink reception, or both for a UE based on multiple TBs for communication for the UE. The communications manager 1120 may be configured as or otherwise support a means for transmitting a DCI signal granting one or more resources to the UE for sidelink transmission, sidelink reception, or both based on the first signal, the DCI signal granting the one or more resources for communication of the multiple TBs.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
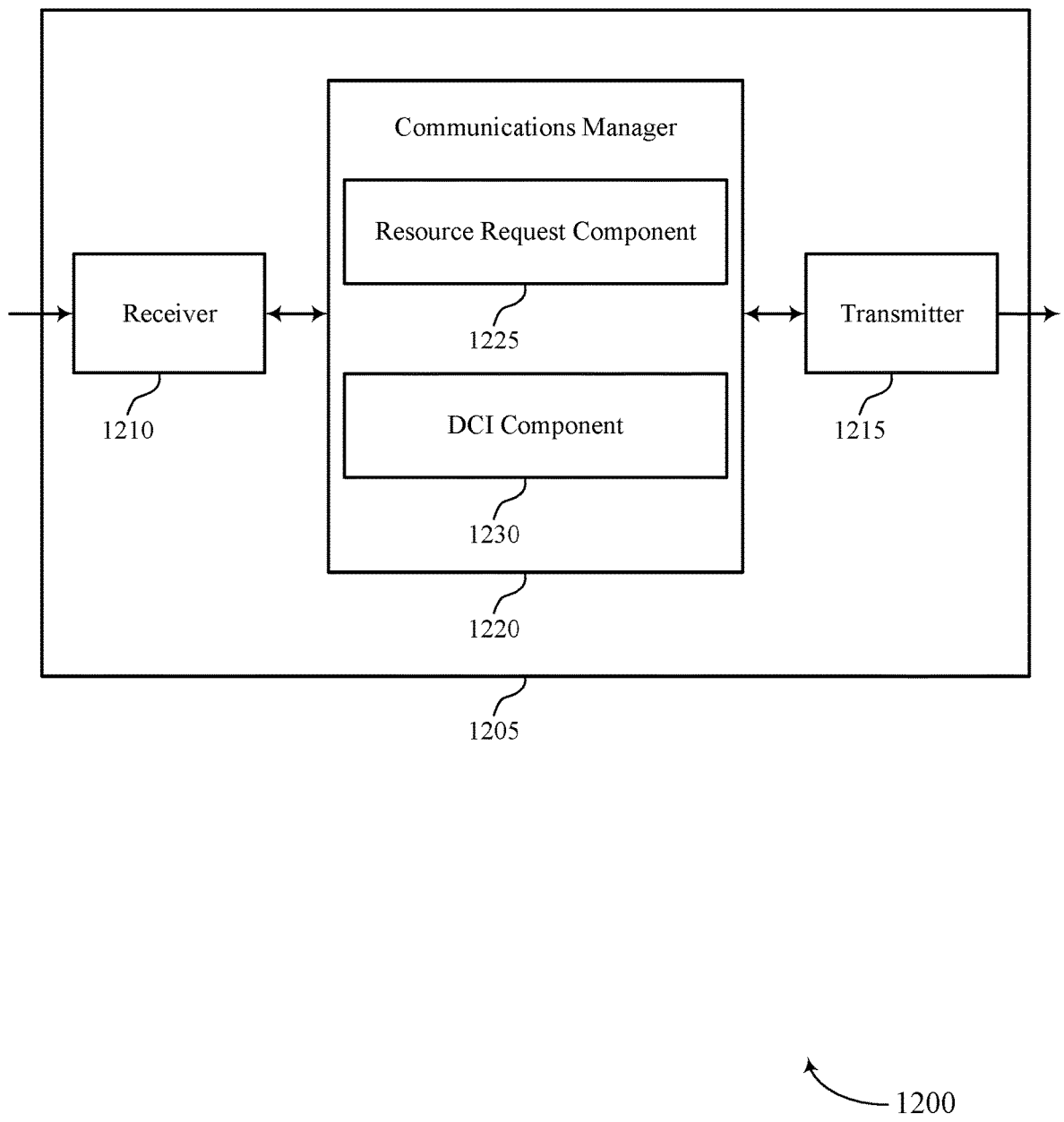

FIG. 12 shows a block diagram 1200 of a device 1205 that supports a multiple TB grant for sidelink in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of configuring multiple TB grants for sidelink as described herein. For example, the communications manager 1220 may include a resource request component 1225, a DCI component 1230, or both. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The resource request component 1225 may be configured as or otherwise support a means for receiving a first signal requesting a modification of allocated resources for sidelink transmission, sidelink reception, or both for a UE based on multiple TBs for communication for the UE. The DCI component 1230 may be configured as or otherwise support a means for transmitting a DCI signal granting one or more resources to the UE for sidelink transmission, sidelink reception, or both based on the first signal, the DCI signal granting the one or more resources for communication of the multiple TBs.

Figure 13:
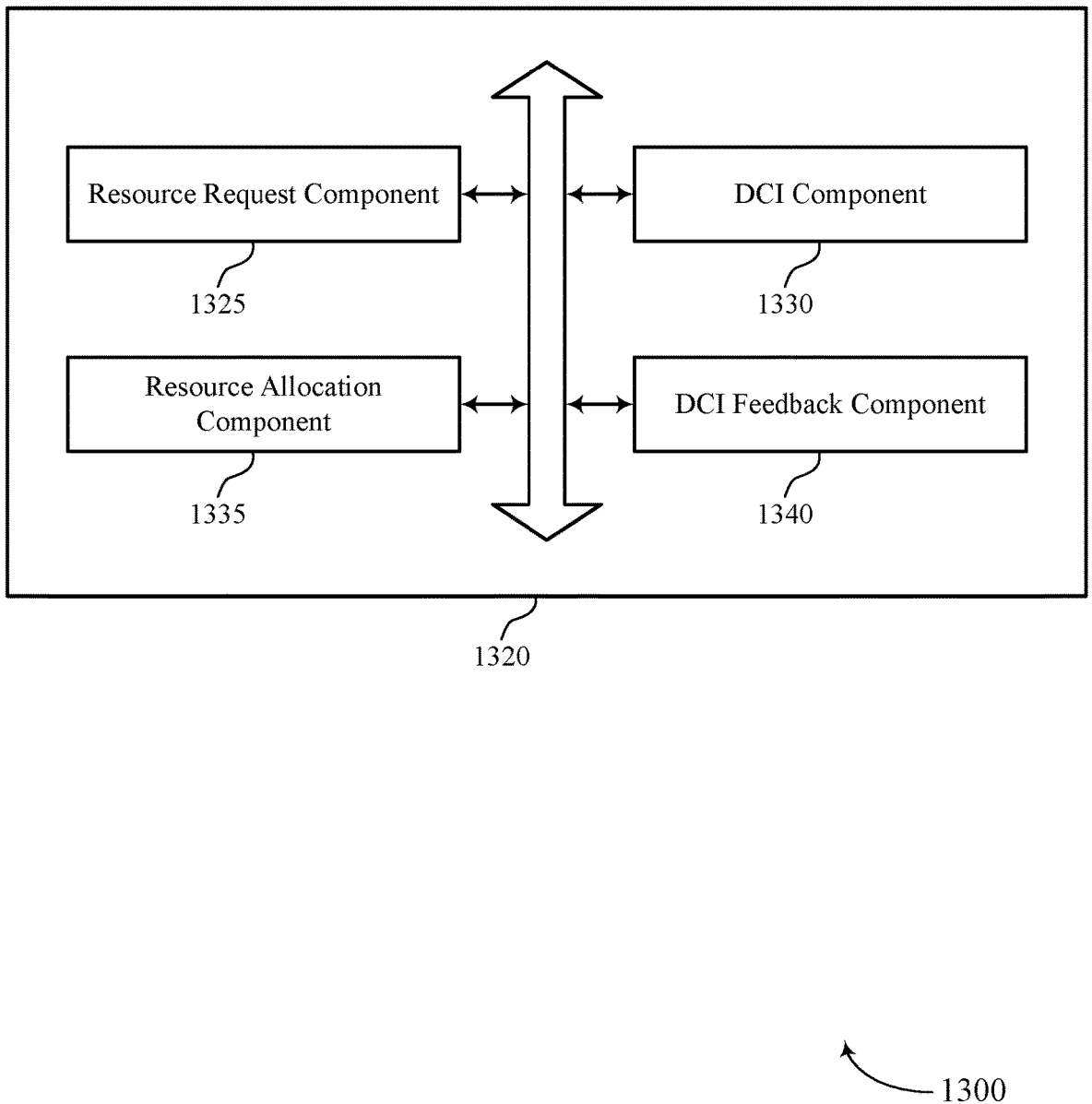
FIG. 13 shows a block diagram of a communications manager that supports a multiple TB grant for sidelink in accordance with one or more aspects of the present disclosure.

FIG. 13 shows a block diagram 1300 of a communications manager 1320 that supports a multiple TB grant for sidelink in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of configuring multiple TB grants for sidelink as described herein. For example, the communications manager 1320 may include a resource request component 1325, a DCI component 1330, a resource allocation component 1335, a DCI feedback component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The resource request component 1325 may be configured as or otherwise support a means for receiving a first signal requesting a modification of allocated resources for sidelink transmission, sidelink reception, or both for a UE based on multiple TBs for communication for the UE. The DCI component 1330 may be configured as or otherwise support a means for transmitting a DCI signal granting one or more resources to the UE for sidelink transmission, sidelink reception, or both based on the first signal, the DCI signal granting the one or more resources for communication of the multiple TBs.

In some examples, the resource allocation component 1335 may be configured as or otherwise support a means for allocating a first set of resources for sidelink transmission at the UE based on the first signal including an accumulated buffer status report associated with a quantity of information for sidelink transmission at the UE, where the granted one or more resources include the first set of resources.

In some examples, the resource allocation component 1335 may be configured as or otherwise support a means for allocating a second set of resources for sidelink reception at the UE based on the first signal including a preemptive buffer status report associated with a quantity of information for sidelink reception at the UE, where the granted one or more resources include the second set of resources.

In some examples, the first signal indicates a negative value associated with the modification of the allocated resources. In some examples, the granted one or more resources includes a first quantity of resources that is less than a second quantity of resources corresponding to the allocated resources to be modified.

In some examples, the DCI feedback component 1340 may be configured as or otherwise support a means for receiving, in response to the DCI signal, a feedback signal indicating that the DCI signal is received at the UE.

In some examples, the feedback signal requests allocation of additional resources, and the DCI feedback component 1340 may be configured as or otherwise support a means for transmitting a second DCI signal based on the feedback signal.

In some examples, the DCI signal indicates a grant index corresponding to the granted one or more resources, and the DCI component 1330 may be configured as or otherwise support a means for transmitting a second DCI signal modifying the granted one or more resources, deactivating the granted one or more resources, canceling the granted one or more resources, or any combination thereof based on the second DCI signal indicating the grant index.

In some examples, the DCI signal dynamically grants a first set of resources, periodically grants a second set of resources according to a periodicity, or both. In some examples, the DCI signal grants a first set of resources for sidelink transmission from the UE, a second set of resources for sidelink reception at the UE, a third set of resources for sidelink transmission, sidelink reception, or both for the UE, or any combination thereof.

In some examples, the DCI signal indicates a transmit power for sidelink transmission, sidelink reception, or both, a set of allowed beams, a set of allowed beam directions, a set of prohibited beams, a set of prohibited beam directions, or any combination thereof.

Figure 14:
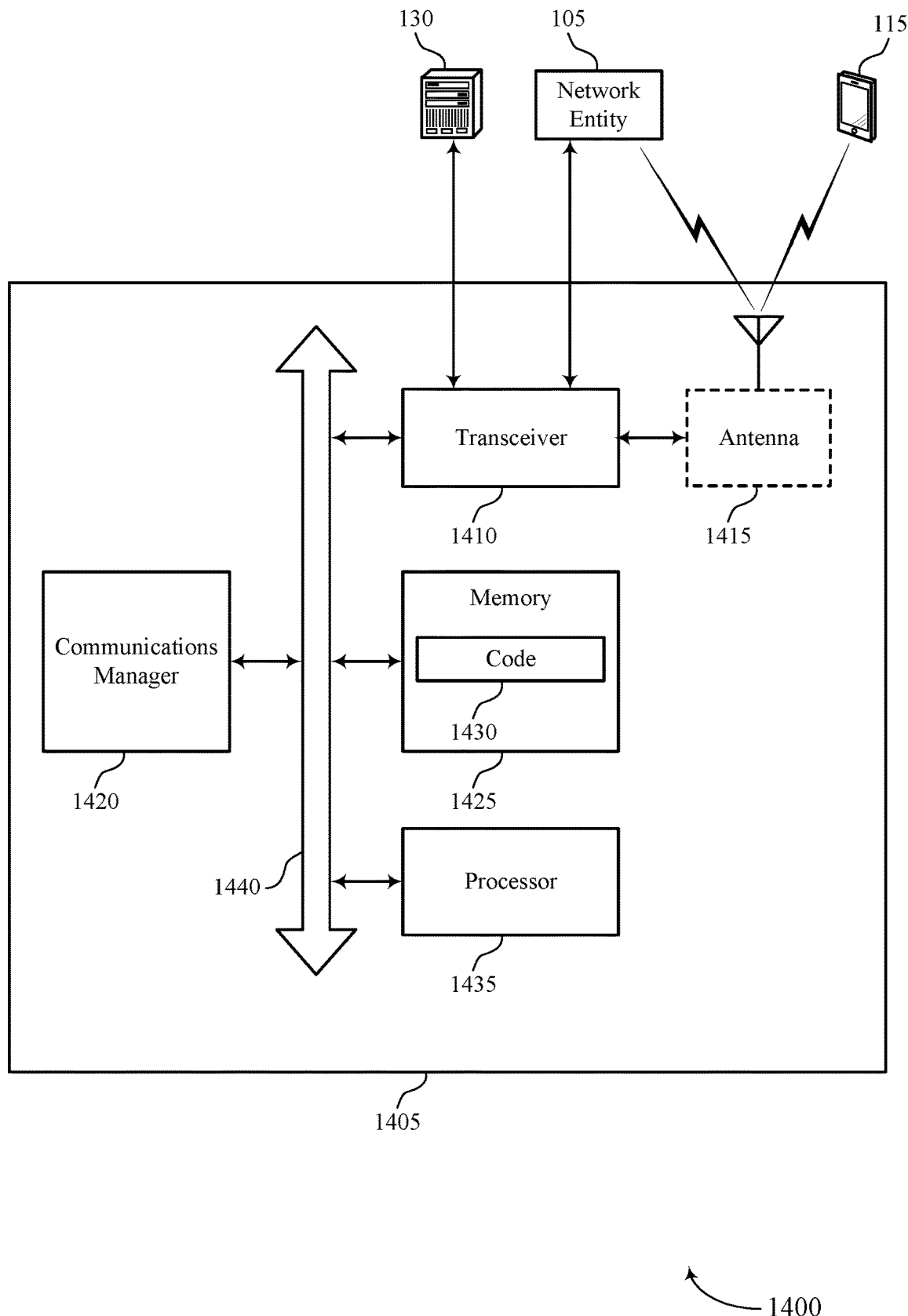
FIG. 14 shows a diagram of a system including a device that supports a multiple TB grant for sidelink in accordance with one or more aspects of the present disclosure.

FIG. 14 shows a diagram of a system 1400 including a device 1405 that supports a multiple TB grant for sidelink in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting multiple TB grants for sidelink). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105 and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for receiving a first signal requesting a modification of allocated resources for sidelink transmission, sidelink reception, or both for a UE based on multiple TBs for communication for the UE. The communications manager 1420 may be configured as or otherwise support a means for transmitting a DCI signal granting one or more resources to the UE for sidelink transmission, sidelink reception, or both based on the first signal, the DCI signal granting the one or more resources for communication of the multiple TBs.

By including or configuring the communications manager 1420 in accordance with examples as described herein, the device 1405 may support techniques for reducing latency and improving flexibility in scheduling sidelink communications.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of configuring multiple TB grants for sidelink as described herein, or the processor 1435 and the memory 1425 may be otherwise configured to perform or support such operations.

Figure 15:
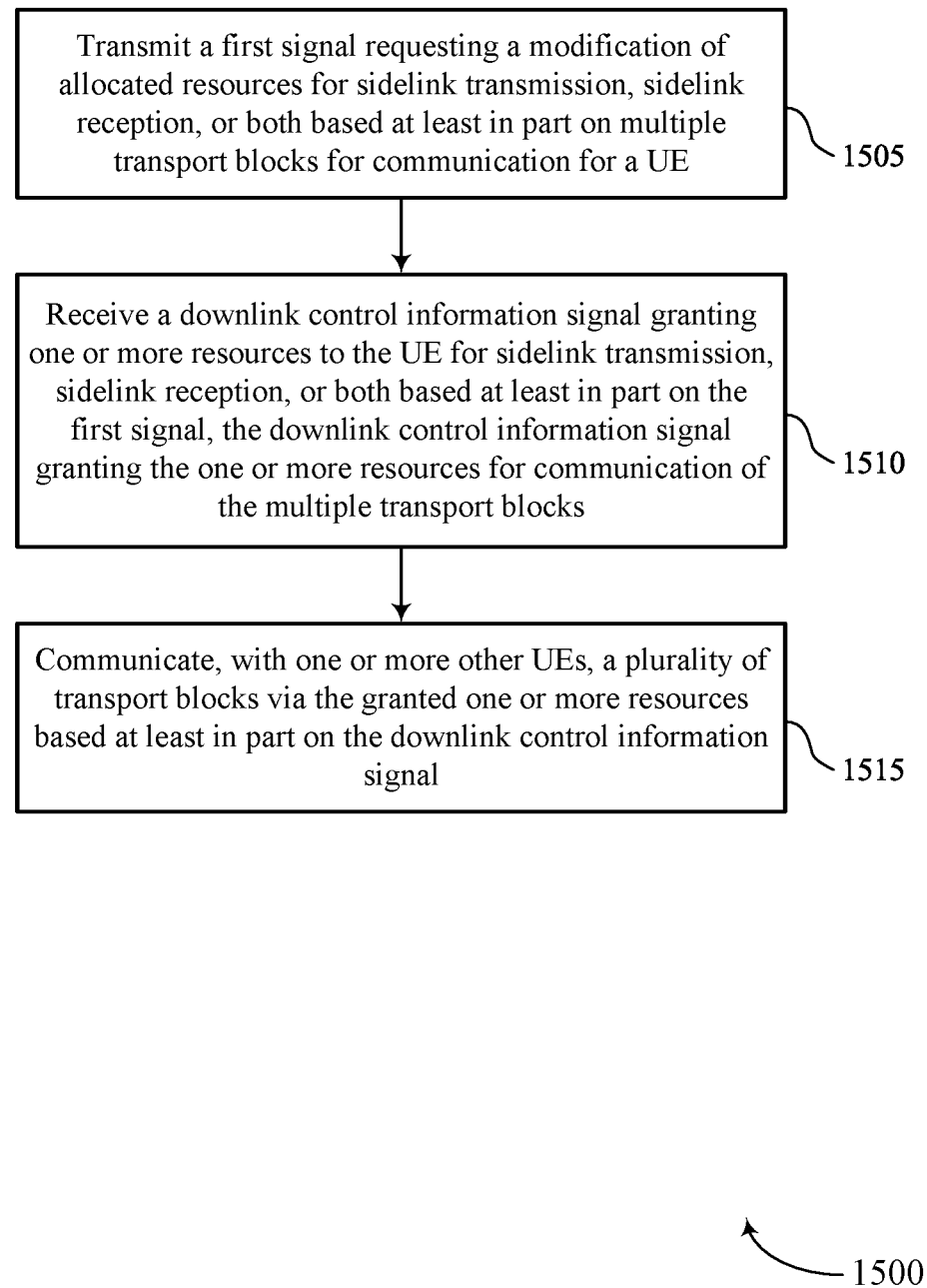
FIGS. 15 through 18 show flowcharts illustrating methods that support a multiple TB grant for sidelink in accordance with one or more aspects of the present disclosure.

FIG. 15 shows a flowchart illustrating a method 1500 that supports a multiple TB grant for sidelink in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting a first signal requesting a modification of allocated resources for sidelink transmission, sidelink reception, or both based on multiple TBs for communication for the UE. The operations of 1505 may be performed in accordance with examples as disclosed herein. In some examples, aspects of the operations of 1505 may be performed by a resource request component 925 as described with reference to FIG. 9.

At 1510, the method may include receiving a DCI signal granting one or more resources to the UE for sidelink transmission, sidelink reception, or both based on the first signal, the DCI signal granting the one or more resources for communication of the multiple TBs. The operations of 1510 may be performed in accordance with examples as disclosed herein. In some examples, aspects of the operations of 1510 may be performed by a DCI component 930 as described with reference to FIG. 9.

At 1515, the method may include communicating, with one or more other UEs, a set of multiple TBs via the granted one or more resources based on the DCI signal. The operations of 1515 may be performed in accordance with examples as disclosed herein. In some examples, aspects of the operations of 1515 may be performed by a sidelink communication component 935 as described with reference to FIG. 9.

Figure 16:
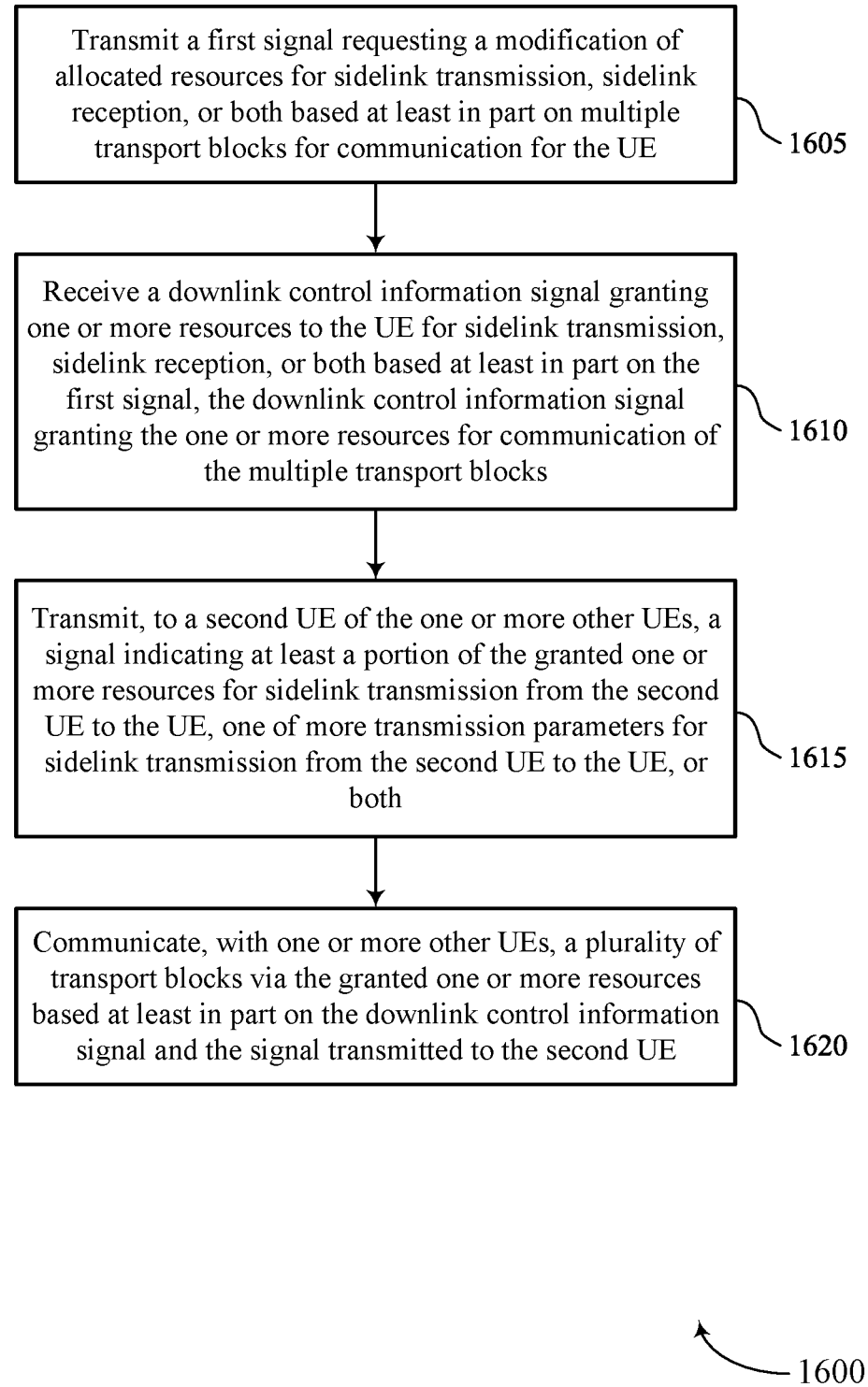

FIG. 16 shows a flowchart illustrating a method 1600 that supports a multiple TB grant for sidelink in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting a first signal requesting a modification of allocated resources for sidelink transmission, sidelink reception, or both based on multiple TBs for communication for the UE. The operations of 1605 may be performed in accordance with examples as disclosed herein. In some examples, aspects of the operations of 1605 may be performed by a resource request component 925 as described with reference to FIG. 9.

At 1610, the method may include receiving a DCI signal granting one or more resources to the UE for sidelink transmission, sidelink reception, or both based on the first signal, the DCI signal granting the one or more resources for communication of the multiple TBs. The operations of 1610 may be performed in accordance with examples as disclosed herein. In some examples, aspects of the operations of 1610 may be performed by a DCI component 930 as described with reference to FIG. 9.

At 1615, the method may include transmitting, to a second UE of the one or more other UEs, a signal indicating at least a portion of the granted one or more resources for sidelink transmission from the second UE to the UE, one of more transmission parameters for sidelink transmission from the second UE to the UE, or both. The operations of 1615 may be performed in accordance with examples as disclosed herein. In some examples, aspects of the operations of 1615 may be performed by a resource indication component 945 as described with reference to FIG. 9.

At 1620, the method may include communicating, with one or more other UEs, a set of multiple TBs via the granted one or more resources based on the DCI signal and the signal transmitted to the second UE. The operations of 1620 may be performed in accordance with examples as disclosed herein. In some examples, aspects of the operations of 1620 may be performed by a sidelink communication component 935 as described with reference to FIG. 9.

Figure 17:
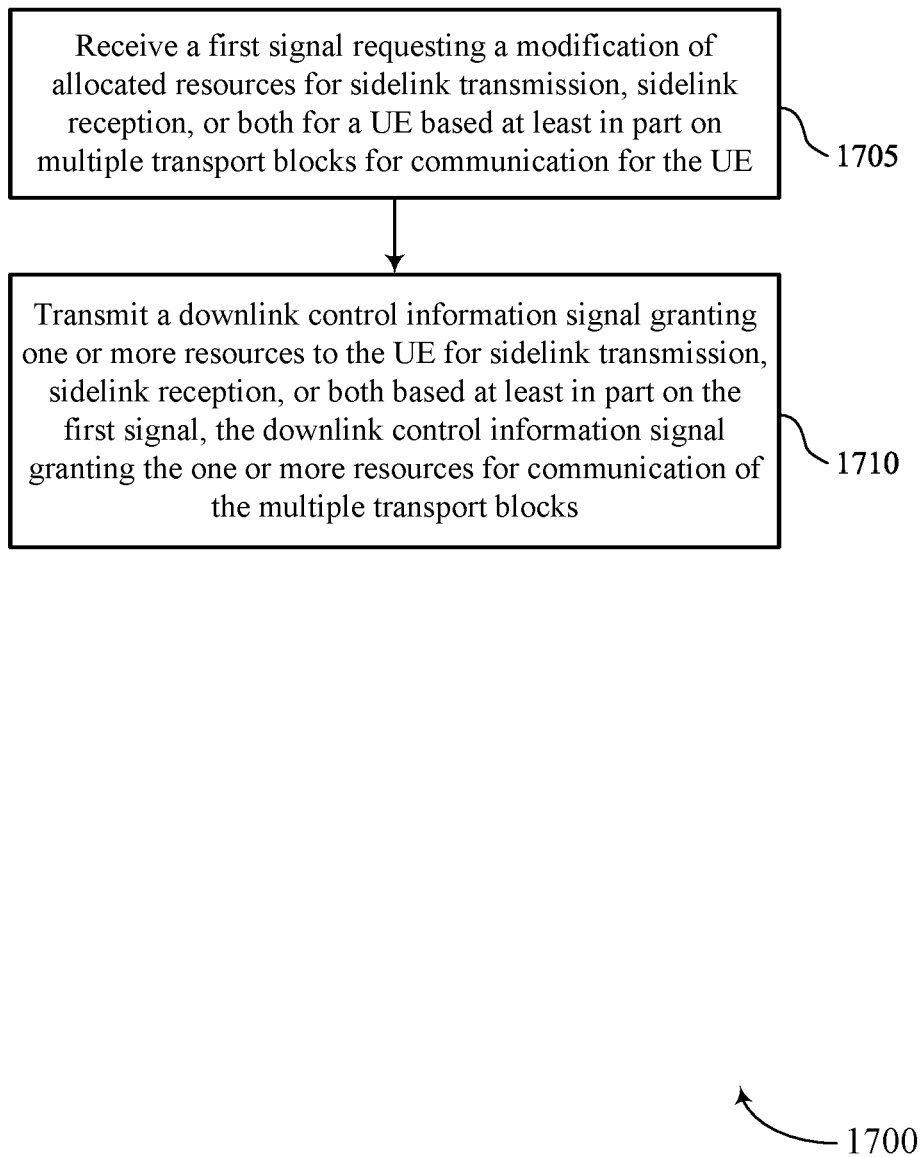

FIG. 17 shows a flowchart illustrating a method 1700 that supports a multiple TB grant for sidelink in accordance with one or more aspects of the present disclosure. The operations of the method 1700 may be implemented by a network entity or its components as described herein. For example, the operations of the method 1700 may be performed by a network entity as described with reference to FIGS. 1 through 6. and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include receiving a first signal requesting a modification of allocated resources for sidelink transmission, sidelink reception, or both for a UE based on multiple TBs for communication for the UE. The operations of 1705 may be performed in accordance with examples as disclosed herein. In some examples, aspects of the operations of 1705 may be performed by a resource request component 1325 as described with reference to FIG. 13.

At 1710, the method may include transmitting a DCI signal granting one or more resources to the UE for sidelink transmission, sidelink reception, or both based on the first signal, the DCI signal granting the one or more resources for communication of the multiple TBs. The operations of 1710 may be performed in accordance with examples as disclosed herein. In some examples, aspects of the operations of 1710 may be performed by a DCI component 1330 as described with reference to FIG. 13.

Figure 18:
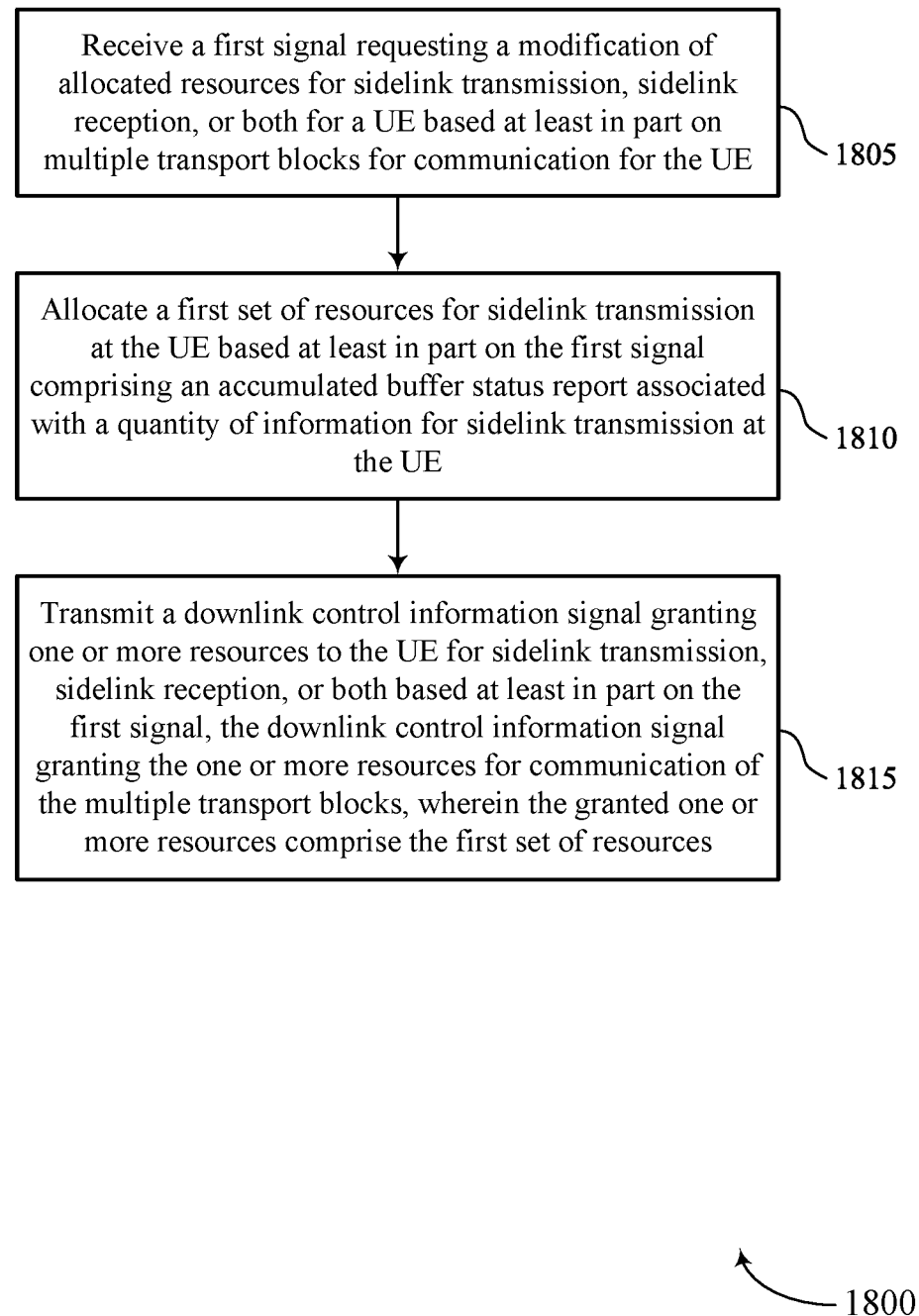

FIG. 18 shows a flowchart illustrating a method 1800 that supports a multiple TB grant for sidelink in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving a first signal requesting a modification of allocated resources for sidelink transmission, sidelink reception, or both for a UE based on multiple TBs for communication for the UE. The operations of 1805 may be performed in accordance with examples as disclosed herein. In some examples, aspects of the operations of 1805 may be performed by a resource request component 1325 as described with reference to FIG. 13.

At 1810, the method may include allocating a first set of resources for sidelink transmission at the UE based on the first signal including an accumulated buffer status report associated with a quantity of information for sidelink transmission at the UE. The operations of 1810 may be performed in accordance with examples as disclosed herein. In some examples, aspects of the operations of 1810 may be performed by a resource allocation component 1335 as described with reference to FIG. 13.

At 1815, the method may include transmitting a DCI signal granting one or more resources to the UE for sidelink transmission, sidelink reception, or both based on the first signal, the DCI signal granting the one or more resources for communication of the multiple TBs, where the granted one or more resources include the first set of resources. The operations of 1815 may be performed in accordance with examples as disclosed herein. In some examples, aspects of the operations of 1815 may be performed by a DCI component 1330 as described with reference to FIG. 13.

The following provides an overview of aspects of the present disclosure:

Aspect 1: A method for wireless communications at a UE, comprising: transmitting a first signal requesting a modification of allocated resources for sidelink transmission, sidelink reception, or both based at least in part on multiple TBs for communication for the UE; receiving a DCI signal granting one or more resources to the UE for sidelink transmission, sidelink reception, or both based at least in part on the first signal, the DCI signal granting the one or more resources for communication of the multiple TBs; and communicating, with one or more other UEs, a plurality of TBs via the granted one or more resources based at least in part on the DCI signal.

Aspect 2: The method of aspect 1, further comprising: generating an accumulated BSR based at least in part on a quantity of information stored using a buffer for transmission to a plurality of other UEs, wherein the first signal comprises the accumulated BSR.

Aspect 3: The method of any of aspects 1 through 2, further comprising: generating a preemptive BSR based at least in part on a quantity of information expected for reception at the UE from a plurality of other UEs, wherein the first signal comprises the preemptive BSR.

Aspect 4: The method of any of aspects 1 through 3, wherein: the first signal indicates a negative value associated with the modification of the allocated resources; and the granted one or more resources comprises a first quantity of resources that is less than a second quantity of resources corresponding to the allocated resources to be modified.

Aspect 5: The method of any of aspects 1 through 4, further comprising: transmitting, to a second UE of the one or more other UEs, a signal indicating at least a portion of the granted one or more resources for sidelink transmission from the second UE to the UE, one of more transmission parameters for sidelink transmission from the second UE to the UE, or both, wherein the communicating is based at least in part on the signal.

Aspect 6: The method of any of aspects 1 through 5, wherein the communicating comprises: transmitting a first TB of the plurality of TBs via a first subset of the granted one or more resources configured for sidelink transmission that is at least a first threshold time after the DCI signal is received; and receiving a second TB of the plurality of TBs via a second subset of the granted one or more resources configured for sidelink reception that is at least a second threshold time after the DCI signal is received, the second threshold time being greater than the first threshold time.

Aspect 7: The method of any of aspects 1 through 6, further comprising: transmitting, in response to the DCI signal, a feedback signal indicating that the DCI signal is received.

Aspect 8: The method of aspect 7, wherein the feedback signal requests allocation of additional resources, cancelation of a subset of the granted one or more resources, or both based at least in part on the granted one or more resources.

Aspect 9: The method of any of aspects 1 through 8, wherein the DCI signal indicates a grant index corresponding to the granted one or more resources, the method further comprising: receiving a second DCI signal modifying the granted one or more resources, deactivating the granted one or more resources, canceling the granted one or more resources, or any combination thereof based at least in part on the second DCI signal indicating the grant index.

Aspect 10: The method of any of aspects 1 through 9, wherein the communicating comprises: transmitting, to one or more first UEs, one or more first TBs via the granted one or more resources; receiving, from one or more second UEs, one or more second TBs via the granted one or more resources; or both.

Aspect 11: The method of any of aspects 1 through 10, wherein the communicating comprises: communicating a TB of the plurality of TBs based at least in part on a transmit power indicated according to the DCI signal.

Aspect 12: The method of any of aspects 1 through 11, wherein the communicating comprises: communicating a TB of the plurality of TBs using a beam based at least in part on a set of allowed beams, a set of allowed beam directions, a set of prohibited beams, a set of prohibited beam directions, or any combination thereof indicated according to the DCI signal.

Aspect 13: The method of any of aspects 1 through 12, wherein the communicating comprises: communicating a first TB of the plurality of TBs via a first subset of the granted one or more resources; and communicating a second TB of the plurality of TBs via a second subset of the granted one or more resources, the first subset of the granted one or more resources being distinct from the second subset of the granted one or more resources.

Aspect 14: The method of any of aspects 1 through 13, further comprising: transmitting one or more sidelink CSI-RSs based at least in part on the DCI signal indicating a set of resources configured for sidelink CSI-RSs.

Aspect 15: The method of any of aspects 1 through 14, wherein the DCI signal dynamically grants a first set of resources, periodically grants a second set of resources according to a periodicity, or both.

Aspect 16: The method of any of aspects 1 through 15, wherein the DCI signal grants a first set of resources for sidelink transmission from the UE, a second set of resources for sidelink reception at the UE, a third set of resources for sidelink transmission, sidelink reception, or both for the UE, or any combination thereof.

Aspect 17: The method of any of aspects 1 through 16, wherein a first TB of the plurality of TBs corresponds to a first HPN, a first NDI, or both; and a second TB of the plurality of TBs corresponds to a second HPN different from the first HPN, a second NDI different from the first NDI, or both.

Aspect 18: A method for wireless communications at a network entity, comprising: receiving a first signal requesting a modification of allocated resources for sidelink transmission, sidelink reception, or both for a UE based at least in part on multiple TBs for communication for the UE; and transmitting a DCI signal granting one or more resources to the UE for sidelink transmission, sidelink reception, or both based at least in part on the first signal, the DCI signal granting the one or more resources for communication of the multiple TBs.

Aspect 19: The method of aspect 18, further comprising: allocating a first set of resources for sidelink transmission at the UE based at least in part on the first signal comprising an accumulated BSR associated with a quantity of information for sidelink transmission at the UE, wherein the granted one or more resources comprise the first set of resources.

Aspect 20: The method of any of aspects 18 through 19, further comprising: allocating a second set of resources for sidelink reception at the UE based at least in part on the first signal comprising a preemptive BSR associated with a quantity of information for sidelink reception at the UE, wherein the granted one or more resources comprise the second set of resources.

Aspect 21: The method of any of aspects 18 through 20, wherein: the first signal indicates a negative value associated with the modification of the allocated resources; and the granted one or more resources comprises a first quantity of resources that is less than a second quantity of resources corresponding to the allocated resources to be modified.

Aspect 22: The method of any of aspects 18 through 21, further comprising: receiving, in response to the DCI signal, a feedback signal indicating that the DCI signal is received at the UE.

Aspect 23: The method of aspect 22, wherein the feedback signal requests allocation of additional resources, cancelation of a subset of the granted one or more resources, or both based at least in part on the granted one or more resources, the method further comprising: transmitting a second DCI signal based at least in part on the feedback signal.

Aspect 24: The method of any of aspects 18 through 23, wherein the DCI signal indicates a grant index corresponding to the granted one or more resources, the method further comprising: transmitting a second DCI signal modifying the granted one or more resources, deactivating the granted one or more resources, canceling the granted one or more resources, or any combination thereof based at least in part on the second DCI signal indicating the grant index.

Aspect 25: The method of any of aspects 18 through 24, wherein the DCI signal dynamically grants a first set of resources, periodically grants a second set of resources according to a periodicity, or both.

Aspect 26: The method of any of aspects 18 through 25, wherein the DCI signal grants a first set of resources for sidelink transmission from the UE, a second set of resources for sidelink reception at the UE, a third set of resources for sidelink transmission, sidelink reception, or both for the UE, or any combination thereof.

Aspect 27: The method of any of aspects 18 through 26, wherein the DCI signal indicates a transmit power for sidelink transmission, sidelink reception, or both, a set of allowed beams, a set of allowed beam directions, a set of prohibited beams, a set of prohibited beam directions, or any combination thereof.

Aspect 28: An apparatus for wireless communications at a UE, comprising a processor; memory coupled with the processor; and instructions stored in the memory and executable by the processor to cause the apparatus to perform a method of any of aspects 1 through 17.

Aspect 29: An apparatus for wireless communications at a UE, comprising at least one means for performing a method of any of aspects 1 through 17.

Aspect 30: A non-transitory computer-readable medium storing code for wireless communications at a UE, the code comprising instructions executable by a processor to perform a method of any of aspects 1 through 17.

Aspect 31: An apparatus for wireless communications at a network entity, comprising a processor; memory coupled with the processor; and instructions stored in the memory and executable by the processor to cause the apparatus to perform a method of any of aspects 18 through 27.

Aspect 32: An apparatus for wireless communications at a network entity, comprising at least one means for performing a method of any of aspects 18 through 27.

Aspect 33: A non-transitory computer-readable medium storing code for wireless communications at a network entity, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
at least one processor;
at least one memory coupled with the at least one processor; and
instructions stored in the at least one memory and executable by the at least one processor to cause the apparatus to:
transmit a first signal requesting a modification of a grant allocating first resources to the UE for sidelink transmission, sidelink reception, or both based at least in part on multiple transport blocks for communication for the UE;
receive a downlink control information signal modifying the grant based at least in part on the first signal, the downlink control information signal granting one or more resources to the UE for the sidelink transmission, the sidelink reception, or both of the multiple transport blocks; and
communicate, with one or more other UEs, a plurality of transport blocks via the granted one or more resources based at least in part on the downlink control information signal.

2. The apparatus of claim 1, wherein the instructions are further executable by the at least one processor to cause the apparatus to:
generate an accumulated buffer status report based at least in part on a quantity of information stored using a buffer for transmission to a plurality of other UEs, wherein the first signal comprises the accumulated buffer status report.

3. The apparatus of claim 1, wherein the instructions are further executable by the at least one processor to cause the apparatus to:
generate a preemptive buffer status report based at least in part on a quantity of information expected for reception at the UE from a plurality of other UEs, wherein the first signal comprises the preemptive buffer status report.

4. The apparatus of claim 1, wherein:
the first signal indicates a negative value associated with the modification of the grant; and
the granted one or more resources comprises a first quantity of resources that is less than a second quantity of resources corresponding to the first resources allocated by the grant, wherein the granted one or more resources comprises a subset of the first resources allocated by the grant.

5. The apparatus of claim 1, wherein the instructions are further executable by the at least one processor to cause the apparatus to:
transmit, to a second UE of the one or more other UEs, a signal indicating at least a portion of the granted one or more resources for the sidelink transmission from the second UE to the UE, one or more transmission parameters for the sidelink transmission from the second UE to the UE, or both, wherein the communicating is based at least in part on the signal.

6. The apparatus of claim 1, wherein the instructions to communicate are executable by the at least one processor to cause the apparatus to:
transmit a first transport block of the plurality of transport blocks via a first subset of the granted one or more resources configured for the sidelink transmission that is at least a first threshold time after the downlink control information signal is received; and
receive a second transport block of the plurality of transport blocks via a second subset of the granted one or more resources configured for the sidelink reception that is at least a second threshold time after the downlink control information signal is received, the second threshold time being greater than the first threshold time.

7. The apparatus of claim 1, wherein the instructions are further executable by the at least one processor to cause the apparatus to:
transmit, in response to the downlink control information signal, a feedback signal indicating that the downlink control information signal is received.

8. The apparatus of claim 7, wherein the feedback signal requests allocation of additional resources, cancelation of a subset of the granted one or more resources, or both based at least in part on the granted one or more resources.

9. The apparatus of claim 1, wherein the downlink control information signal indicates a grant index corresponding to the granted one or more resources, and the instructions are further executable by the at least one processor to cause the apparatus to:
receive a second downlink control information signal modifying the granted one or more resources, deactivating the granted one or more resources, canceling the granted one or more resources, or any combination thereof based at least in part on the second downlink control information signal indicating the grant index.

10. The apparatus of claim 1, wherein the instructions to communicate are executable by the at least one processor to cause the apparatus to:
transmit, to one or more first UEs, one or more first transport blocks via the granted one or more resources;
receive, from one or more second UEs, one or more second transport blocks via the granted one or more resources;
or both.

11. The apparatus of claim 1, wherein the instructions to communicate are executable by the at least one processor to cause the apparatus to:
communicate a transport block of the plurality of transport blocks based at least in part on a transmit power indicated according to the downlink control information signal.

12. The apparatus of claim 1, wherein the instructions to communicate are executable by the at least one processor to cause the apparatus to:
communicate a transport block of the plurality of transport blocks using a beam based at least in part on a set of allowed beams, a set of allowed beam directions, a set of prohibited beams, a set of prohibited beam directions, or any combination thereof indicated according to the downlink control information signal.

13. The apparatus of claim 1, wherein the instructions to communicate are executable by the at least one processor to cause the apparatus to:
communicate a first transport block of the plurality of transport blocks via a first subset of the granted one or more resources; and
communicate a second transport block of the plurality of transport blocks different from the first transport block via a second subset of the granted one or more resources, the first subset of the granted one or more resources being distinct from the second subset of the granted one or more resources.

14. The apparatus of claim 1, wherein the instructions are further executable by the at least one processor to cause the apparatus to:
transmit one or more sidelink channel state information reference signals based at least in part on the downlink control information signal indicating a set of resources configured for sidelink channel state information reference signals.

15. The apparatus of claim 1, wherein the downlink control information signal dynamically grants a first set of resources, periodically grants a second set of resources according to a periodicity, or both.

16. The apparatus of claim 1, wherein the downlink control information signal grants a first set of resources for the sidelink transmission from the UE, a second set of resources for the sidelink reception at the UE, a third set of resources for the sidelink transmission, the sidelink reception, or both for the UE, or any combination thereof.

17. The apparatus of claim 1, wherein:
a first transport block of the plurality of transport blocks corresponds to a first hybrid automatic repeat request process number, a first new data indicator, or both; and
a second transport block of the plurality of transport blocks corresponds to a second hybrid automatic repeat request process number different from the first hybrid automatic repeat request process number, a second new data indicator different from the first new data indicator, or both.

18. An apparatus for wireless communications at a network entity, comprising:
at least one processor;
at least one memory coupled with the at least one processor; and
instructions stored in the at least one memory and executable by the at least one processor to cause the apparatus to:
receive a first signal requesting a modification of a grant allocating first resources to a user equipment (UE) for sidelink transmission, sidelink reception, or both based at least in part on multiple transport blocks for communication for the UE; and
transmit a downlink control information signal modifying the grant based at least in part on the first signal, the downlink control information signal granting one or more resources to the UE for the sidelink transmission, the sidelink reception, or both of the multiple transport blocks.

19. The apparatus of claim 18, wherein the instructions are further executable by the at least one processor to cause the apparatus to:
allocate a first set of resources for the sidelink transmission at the UE based at least in part on the first signal comprising an accumulated buffer status report associated with a quantity of information for the sidelink transmission at the UE, wherein the granted one or more resources comprise the first set of resources.

20. The apparatus of claim 18, wherein the instructions are further executable by the at least one processor to cause the apparatus to:
allocate a second set of resources for the sidelink reception at the UE based at least in part on the first signal comprising a preemptive buffer status report associated with a quantity of information for the sidelink reception at the UE, wherein the granted one or more resources comprise the second set of resources.

21. The apparatus of claim 18, wherein:
the first signal indicates a negative value associated with the modification of the grant; and
the granted one or more resources comprises a first quantity of resources that is less than a second quantity of resources corresponding to the first resources allocated by the grant, wherein the granted one or more resources comprises a subset of the first resources allocated by the grant.

22. The apparatus of claim 18, wherein the instructions are further executable by the at least one processor to cause the apparatus to:
receive, in response to the downlink control information signal, a feedback signal indicating that the downlink control information signal is received at the UE.

23. The apparatus of claim 22, wherein the feedback signal requests allocation of additional resources, cancelation of a subset of the granted one or more resources, or both based at least in part on the granted one or more resources, and the instructions are further executable by the at least one processor to cause the apparatus to:
transmit a second downlink control information signal based at least in part on the feedback signal.

24. The apparatus of claim 18, wherein the downlink control information signal indicates a grant index corresponding to the granted one or more resources, and the instructions are further executable by the at least one processor to cause the apparatus to:
transmit a second downlink control information signal modifying the granted one or more resources, deactivating the granted one or more resources, canceling the granted one or more resources, or any combination thereof based at least in part on the second downlink control information signal indicating the grant index.

25. The apparatus of claim 18, wherein the downlink control information signal dynamically grants a first set of resources, periodically grants a second set of resources according to a periodicity, or both.

26. The apparatus of claim 18, wherein the downlink control information signal grants a first set of resources for the sidelink transmission from the UE, a second set of resources for the sidelink reception at the UE, a third set of resources for the sidelink transmission, the sidelink reception, or both for the UE, or any combination thereof.

27. The apparatus of claim 18, wherein the downlink control information signal indicates a transmit power for the sidelink transmission, the sidelink reception, or both, a set of allowed beams, a set of allowed beam directions, a set of prohibited beams, a set of prohibited beam directions, or any combination thereof.

28. A method for wireless communications at a user equipment (UE), comprising:
transmitting a first signal requesting a modification of a grant allocating first resources to the UE for sidelink transmission, sidelink reception, or both based at least in part on multiple transport blocks for communication for the UE;
receiving a downlink control information signal modifying the grant based at least in part on the first signal, the downlink control information signal granting one or more resources to the UE for the sidelink transmission, the sidelink reception, or both of the multiple transport blocks; and
communicating, with one or more other UEs, a plurality of transport blocks via the granted one or more resources based at least in part on the downlink control information signal.

29. The method of claim 28, further comprising:
transmitting, to a second UE of the one or more other UEs, a signal indicating at least a portion of the granted one or more resources for the sidelink transmission from the second UE to the UE, one or more transmission parameters for the sidelink transmission from the second UE to the UE, or both, wherein the communicating is based at least in part on the signal.

30. A method for wireless communications at a network entity, comprising:
receiving a first signal requesting a modification of a grant allocating first resources to a user equipment (UE) for sidelink transmission, sidelink reception, or both based at least in part on multiple transport blocks for communication for the UE; and
transmitting a downlink control information signal modifying the grant based at least in part on the first signal, the downlink control information signal granting one or more resources to the UE for the sidelink transmission, the sidelink reception, or both of the multiple transport blocks.

* * * * *